United States Patent
Wang et al.

(10) Patent No.: US 10,880,683 B2
(45) Date of Patent: Dec. 29, 2020

(54) METHODS OF JOINT REGISTRATION AND DE-REGISTRATION FOR PROXIMITY SERVICES AND INTERNET OF THINGS SERVICES

(71) Applicant: Convida Wireless, LLC, Wilmington, DE (US)

(72) Inventors: Chonggang Wang, Princeton, NJ (US); Qing Li, Princeton Junction, NJ (US); Hongkun Li, Malvern, PA (US); Paul L. Russell, Jr., Pennington, NJ (US); Zhuo Chen, Claymont, DE (US)

(73) Assignee: Convida Wireless, LLC, Wilmington, DE (US)

( * ) Notice: Subject to any disclaimer, the term of this patent is extended or adjusted under 35 U.S.C. 154(b) by 52 days.

(21) Appl. No.: 15/022,575

(22) PCT Filed: Sep. 19, 2014

(86) PCT No.: PCT/US2014/056513
§ 371 (c)(1),
(2) Date: Mar. 17, 2016

(87) PCT Pub. No.: WO2015/042370
PCT Pub. Date: Mar. 26, 2015

(65) Prior Publication Data
US 2016/0227371 A1    Aug. 4, 2016

Related U.S. Application Data

(60) Provisional application No. 61/880,437, filed on Sep. 20, 2013.

(51) Int. Cl.
*H04W 4/02* (2018.01)
*H04W 4/70* (2018.01)
*H04W 4/08* (2009.01)

(52) U.S. Cl.
CPC ............. *H04W 4/023* (2013.01); *H04W 4/70* (2018.02); *H04W 4/08* (2013.01); *Y02D 30/00* (2018.01)

(58) Field of Classification Search
None
See application file for complete search history.

(56) References Cited

U.S. PATENT DOCUMENTS

2006/0116127 A1* 6/2006 Wilhoite ............... H04W 36/14
455/442
2006/0126601 A1* 6/2006 Kim ........................ H04L 67/16
370/352

(Continued)

FOREIGN PATENT DOCUMENTS

CN         1996843 A      7/2007
CN       101119270 A      2/2008

(Continued)

OTHER PUBLICATIONS

Atzori et al, "The Social Internet of Things (SIoT)—When Social Networks Meet the Internet of Things: Concept, Architecture and Network Characterization", Computer Networks, 56, Nov. 14, 2012, 3594-3608.

(Continued)

*Primary Examiner* — Younes Naji
(74) *Attorney, Agent, or Firm* — BakerHostetler

(57) ABSTRACT

Disclosed herein are a variety of devices, methods, and systems for combined proximity services and Internet of Things (IoT) services registration or de-registration. An exemplary method includes one or more of receiving a device initiated IoT service registration request, wherein proximity information relating to the device is contained within the received IoT service registration request; receiving a device initiated proximity service registration request, wherein IoT service information relating to the device is (Continued)

contained within the received IoT service registration request; sending, from an IoT server, a proximity service registration message; and sending, from a proximity manager, an IoT service registration request.

14 Claims, 24 Drawing Sheets

(56) References Cited

U.S. PATENT DOCUMENTS

| | | | |
|---|---|---|---|
| 2009/0316650 A1* | 12/2009 | Um | H04W 8/06 370/331 |
| 2011/0171931 A1* | 7/2011 | Kortesniemi | H04L 12/14 455/407 |
| 2012/0185604 A1* | 7/2012 | Shatsky | H04L 67/306 709/228 |
| 2012/0220230 A1 | 8/2012 | Kurata et al. | |
| 2013/0102310 A1* | 4/2013 | Carbo Malonda | H04L 63/107 455/435.1 |
| 2013/0182607 A1 | 7/2013 | Kim et al. | |
| 2014/0066018 A1* | 3/2014 | Zhu | H04L 63/107 455/411 |
| 2014/0301270 A1* | 10/2014 | Johnsson | H04W 72/042 370/328 |
| 2014/0341085 A1* | 11/2014 | Suryavanshi | H04L 65/1016 370/260 |

FOREIGN PATENT DOCUMENTS

| | | |
|---|---|---|
| CN | 101167306 | 4/2008 |
| CN | 102546533 A | 7/2012 |
| EP | 2 582 171 | 4/2013 |
| JP | 2005512407 A | 4/2005 |
| JP | 2006094393 A | 4/2006 |
| JP | 2006-253837 A | 9/2006 |
| JP | 2013-530596 A | 7/2013 |
| JP | 2015-510323 A | 4/2015 |
| KR | 2010-0049237 A | 5/2010 |
| WO | 2006/117282 A1 | 11/2006 |
| WO | WO 2011-138238 A1 | 11/2011 |
| WO | WO 2015-042370 | 3/2015 |

OTHER PUBLICATIONS

Heile, R., IEEE "Wireless Medium Access Control (MAC) and Physical Layer (PHY) Specifications for Peer Aware Communications (PAC)", Feb. 8, 2012, 2 pages.
International Application No. PCT/US2014/056513: International Search Report and the Written Opinion dated Jan. 9, 2015, 11 pages.
ETSI TS 102 690 V 1.1.1 Machine-to-Machine Communications (M2M); Functional Architecture, Oct. 2011, 150 pages.
Korean Patent Application No. 10-2016-7010244: Notice of Preliminary Rejection dated Dec. 16, 2016, 7 pages. (No translation).
3GPP, "Discussion of a ProSe Server Based Architecture", SA WG2 Meeting #96 S2-131185, Release 12, San Diego, USA—Apr. 8-12, 2013, 3 pages, http://www.3gpp.org/ftp/tsg_sa/WG2_Arch/TSGS2_96_San Diego/Docs/52-131185.zip.
3GPP, "EPC-Level Discovery and EPC Support for WLAN Direct Communication" [online], 23.401 V12.1.0, 3GPP TSG-SA WG2#98 S2-132721, Jul. 19, 2013, 12 pages; http://www.3gpp.org/ftp/tsg_sa/WNG2_Arch/TSGS2_98_Valencia/Docs/S2-132721.zip.
3GPP, "Solution for ProSe Discovery and Communication", SA WG2 Meeting #96 S2-130979, ProSe/Release 12, San Diego, USA—Apr. 8-12, 2013, 9 pages, http://www.3gpp.org/ftp/tsg_sa/WG2_Arch/TSGS2_96_San Diego/Docs/S2-130979.zip.
3GPP, Ericsson, ST-Ericsson, "ProSe Reference Architecture Proposal" [online], 3GPP TSG-SA WG2#97 S2-131618, May 31, 2013, 3 pages pageshttp://www.3gpp.org/ftp/tsg_sa/WG2_Arch/TSGS2_97_Busan/Docs/S2-131618.zip.
Japanese Patent Application No. 2016-515389: Notice of Reasons for Rejection dated May 8, 2017, 6 pages.

* cited by examiner

METHODS OF JOINT REGISTRATION AND DE-REGISTRATION FOR PROXIMITY SERVICES AND INTERNET OF THINGS SERVICES

CROSS-REFERENCE TO RELATED APPLICATIONS

This application is a National Stage Application filed under 35 U.S.C. 371 of International Application No. PCT/US2014/056513, filed Sep. 19, 2014, which claims the benefit of, and incorporates herein by reference, U.S. Provisional Application 61/880,437, "Methods of Joint Registration and De-Registration for Proximity Services and Internet of Things Services", filed Sep. 20, 2013.

BACKGROUND

Proximity Communications are related to the awareness of a communicating entities' proximity to desired services in an infrastructure-based or infrastructure-less configuration. This can be a centralized system or a fully distributed system without a central controller. Proximity-based applications and services represent a recent and enormous socio-technological trend. Typical examples of proximity communications include smart transportation, social networking, advertisements, and public safety and emergency.

SUMMARY

Proximity communications can be related to Machine to Machine (M2M) and Internet of Things (IoT) systems such as smart environment and smart transportation. By leveraging Proximity Communications, the performance of those M2M/IoT applications can be improved. Also more new M2M/IoT applications can be enabled by Proximity Communications. Several standards setting organizations are working on Proximity Communication standardization such as IEEE 802.15.8.

Disclosed herein are a variety of devices, methods, and systems for combined proximity services and IoT services registration or de-registration. An exemplary method includes one or more of receiving a device initiated IoT service registration request, wherein proximity information relating to the device is contained within the received IoT service registration request; receiving a device initiated proximity service registration request, wherein IoT service information relating to the device is contained within the received IoT service registration request; sending, from an IoT server, a proximity service registration message; and sending, from a proximity manager, an IoT service registration request.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

DETAILED DESCRIPTION OF ILLUSTRATIVE EMBODIMENTS

IoT services can provide service layer functionalities for IoT entities (e.g. IoT devices, IoT gateways, IoT servers, IoT applications) to interact with each other. IoT service layer functionalities include service registration, service discovery, data storage, data exchange, device management, etc. An IoT entity can provide IoT services for other IoT entities, or it can leverage IoT services provided by other IoT entities. In order to leverage IoT services on other IoT entities, the IoT entity basically needs to register itself with the other entity. For example, an IoT device needs to first conduct IoT service registration with an IoT server (or an IoT gateway, another IoT device) in order to exploit IoT services provided by the IoT server (or the IoT gateway, another IoT device).

In this disclosure, the scenario where IoT devices are enabled with both IoT services and proximity services is considered. IoT services are provided by IoT servers, while proximity services are provided by proximity managers. The proximity manager and the IoT server may have different owners; or may be implemented as different entities in the IoT network.

With respect to IoT services, an IoT device needs to make IoT service registration with an IoT server so that: 1) the device can leverage the IoT services provided by the IoT server; and 2) the IoT server can monitor, manage, and control the IoT device from IoT service perspective.

In the context of proximity services, a proximity manager is used to provide proximity services. In order to leverage such proximity services, the IoT device also needs to perform proximity service registration with the proximity manager.

Figure 1:
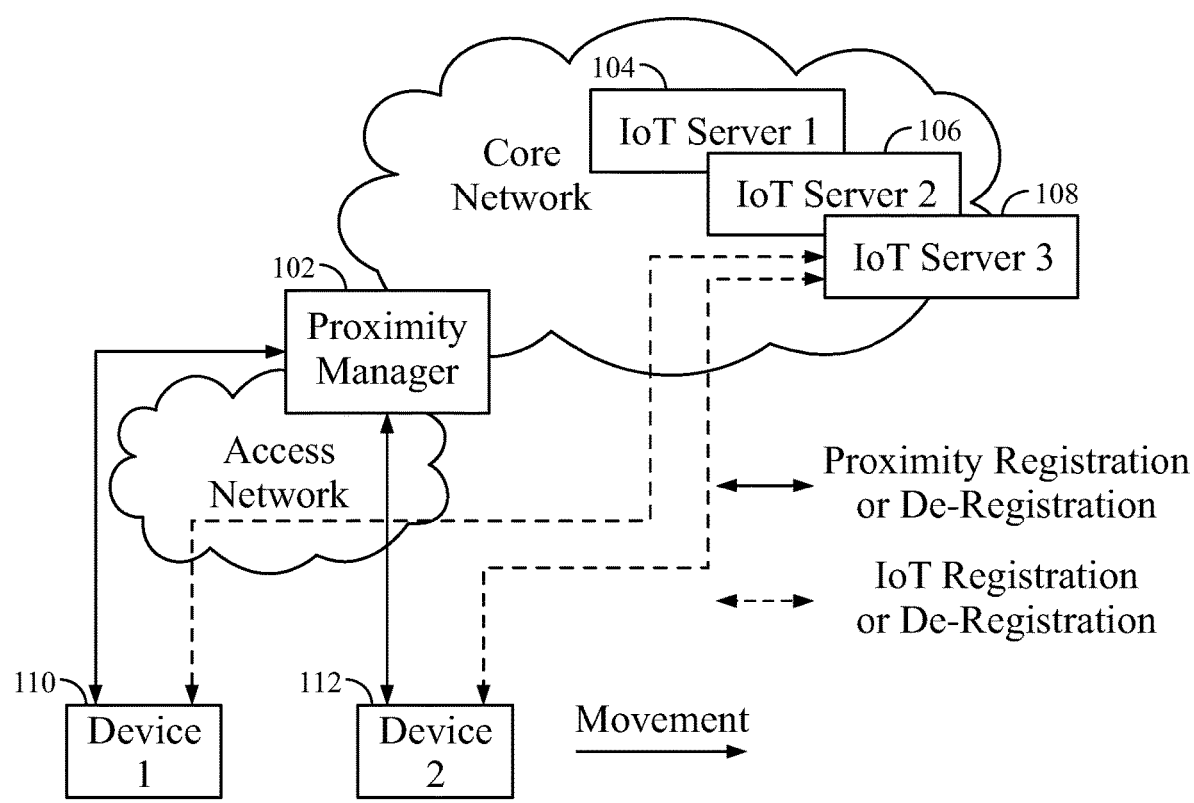
FIG. 1 is a diagram that illustrates an example based on known schemes.

FIG. 1 illustrates an example based on existing schemes, where there are two devices, one proximity manager 102, and three IoT servers 104, 106 and 108. As mentioned earlier, the proximity manager 102 provides proximity services such as link management, while IoT servers 104, 106 and 108 provide IoT services such as service discovery, data management, and device management. In this example, the proximity manager 102 can reside in core network or access network but it is definitely able to manage, control and monitor the direct communication link between "device 1" 110 and "device 2" 112. The three IoT servers 104, 106 and 108 are deployed in the core network or in the cloud. In order to leverage proximity services and enable direct communications, "device 1" 110 and "device 2" 112 first need to make registration with the proximity manager 102; in other words, the proximity manager 102, only after receiving proximity registration from both device, will be able to instruct both devices when and how to enable direct communications and what's the allocated link resource for direct communications. In the meantime, both devices as IoT devices need to register themselves with IoT server (i.e. "IoT server 3" 108 in this example) in order to exploit IoT services provided by the "IoT server 3" 108. Likewise, there are proximity de-registration and IoT de-registration to cancel previously established proximity registration and IoT registration.

As shown in FIG. 1, both types of registration are currently treated independently. During IoT registration, "IoT server 3" 108 does not know any proximity-related information about "device 1" 110, "device 2" 112, and/or the proximity manager 102. Likewise, during proximity registration, the proximity manager 102 does not know any information about IoT servers 104, 106 and 108 and IoT services which "device 1" 110 and "device 2" 112 are looking for or in use.

There is no any interaction between the proximity manager 102 and IoT servers 104, 106 and 108 (i.e. no interaction between proximity services and IoT services) However, such independent proximity registration and IoT registration loses many opportunities to enhance the system performance. For example, the proximity manager 102 could allocate direct link resources in a way to better cater for IoT services if it knows about IoT services and/or can interact with IoT servers 104, 106 and 108. In another example, IoT servers 104, 106 and 108 could provide better IoT services if they know the proximity information about their devices and can communicate with the proximity manager 102.

In summary, IoT devices need to register themselves with both the IoT server 104, 106 and 108 and the proximity manager 102 for IoT services and proximity services. Both registrations (i.e. proximity service registration and IoT service registration) are currently treated separately and independently in literature and existing standards, which may introduce extra overhead and fail to exploit dependencies and interactions between proximity services and IoT services. In addition, the IoT devices 110 and 112 may perform de-registration with the IoT server 108 and the proximity manager 102. Thus, new procedures and methods which support joint IoT service and proximity service registration/de-registration in a more efficient manner for proximity-enabled IoT systems would be advantageous.

This disclosure proposes methods for joint proximity services and IoT services registration and de-registration. The proposed joint schemes help to reduce signaling overhead and make the registration/de-registration more efficient. A variety of concepts are disclosed here, including:

Three joint IoT and proximity registration schemes are described:
  Device-initiated service registration where proximity information (or IoT service information) can be piggybacked during IoT registration (or proximity registration).
  IoT-server-assisted service registration where IoT server can help to perform proximity registration for its devices; and.
  Proximity-manager-assisted service registration where proximity manager can help to perform IoT registration for its devices.

The following joint IoT and proximity de-registration schemes are described:
  Device-initiated service de-registration where proximity information (or IoT service information) can be piggybacked during IoT de-registration (or proximity de-registration). Also one device can help to perform de-registration on behalf of other devices in the same proximity.
  IoT-server-assisted service de-registration where IoT server can help to perform proximity de-registration for its devices.
  Proximity-manager-assisted service de-registration where proximity manager can help to perform IoT de-registration for its devices.
  IoT-server-initiated service de-registration where IoT server actively initiates de-registration for a group of devices.
  Proximity-manager-initiated service de-registration where proximity manager actively initiates de-registration for a group of devices.

It should be understood that one or more, up to all, of the above schemes can be used in combination.

Nodes on a network can include servers, gateways, devices, or other computer systems. A first node (such as an proximity manager or IoT server) can register and deregister a device for a first type of service (such as proximity services or M2M/IoT services) and can forward the registration or deregistration to second node (such as an IoT server or proximity manager) for a second type of services (such as proximity services or M2M/IoT services). This avoids the requirement of registering or deregistering a device separately at the first and second node.

Figure 2:
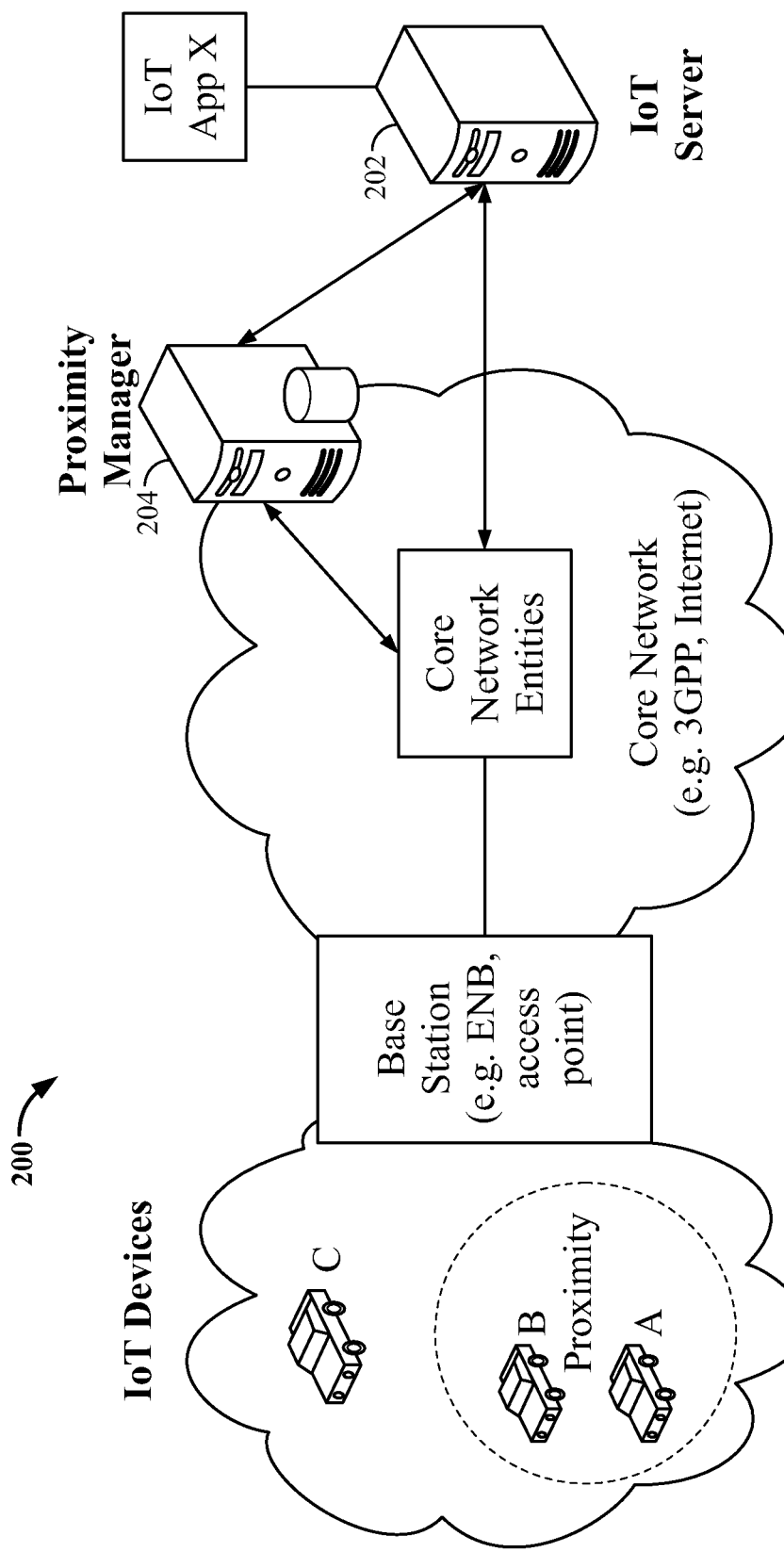
FIG. 2 is a diagram that illustrates an IoT system which leverages proximity services to provide smart transportation.

Exemplary Use Cases. FIG. 2 illustrates an IoT system 200 leveraging proximity services to provide smart transportation. In this example, there are a set of Machine-Type Communications (MTC)-based IoT Devices (i.e. A, B, and C). Each device (e.g. a 3GPP terminal with or without WiFi support manufactured by Huawei or Ericsson) is installed in a vehicle (i.e. A, B, and C). There is also an IoT server 202 to provide IoT services such as data forwarding, data storage, and data sharing. The IoT server is hosted by IoT service providers (e.g. Google) and usually is deployed in the cloud. There is also a proximity manager 204 to provide proximity services such as proximity enablement and direct P2P communications. The proximity manager 204 could be hosted by network providers (e.g. AT&T) or vehicle manufacture (e.g. General Motors). For example, General Motors has OnStar system today, which can be extended by incorporating functions of proximity manager. Each device can have integrated software (e.g. IoT service software and proximity software) to support and use both IoT services and proximity services.

For example, vehicle A and C can leverage IoT services to exchange data via the IoT server 202.

However, vehicles A and B, due to being within the same proximity, are able to leverage proximity services provided by the proximity manager 204 to enable more intelligent IoT services (either bypass IoT server or route through it).

In order to leverage proximity services and IoT services, each device needs to perform registration with both the proximity manager 204 and the IoT server 202.

This is done independently via separate procedures according to existing standards such as ETSI M2M (i.e., ETSI TC M2M TS 102 690 Functional Architecture) which may introduce extra overhead and fail to exploit independencies and interactions between proximity services and IoT services.

In order to tackle this problem, a joint IoT service and proximity service registration/de-registration is used in which both registrations are treated together provides a more efficient approach.

Joint IoT Service and Proximity Service Registration

Approach 1: Device-Initiated Registration

Figure 3:
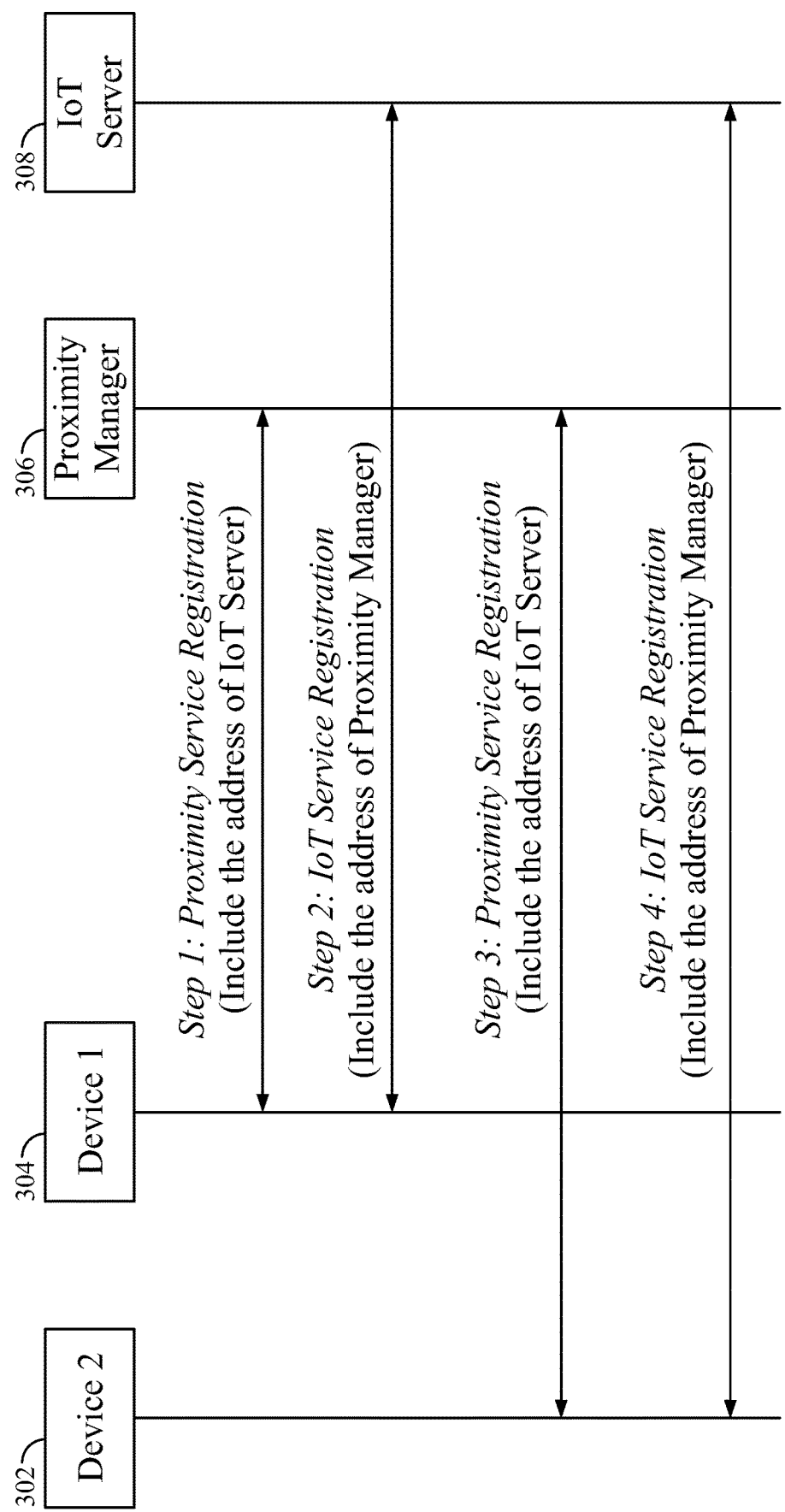
FIG. 3 is a diagram that illustrates an exemplary approach to joint IoT service and proximity service registration.

The proposed first approach is shown in FIG. 3. In this approach, it is assumed that devices know the address of both the proximity manager 306 and the IoT Server 308 via different approaches (e.g. provisioning, discovery, etc.)

In step 1 of FIG. 3, "device 1" 304 registers with the proximity manager 306 by sending a "Proximity Service Registration" request message. During this step, "device 1" 304 informs the proximity manager 306 of the address of its IoT Server 308 by embedding it in proximity registration message. Device 1 can also indicate its IoT registration status in this step if Step 1 happens after Step 2.

For example, if device 1 is a 3GPP device, it can optionally store the addresses of both the proximity manager and the IoT server 308 in Home Subscriber Set (HSS).

During this step, "device 1" 304 may indicate multiple IoT servers to the proximity manager. The proximity manager can help to select an appropriate IoT server 308 for "device 1"304 and may notify "device 1"304 of the selected IoT server 308.

The selection could be based on context information of "device 1"304 (e.g. its location) and context information of IoT server (e.g. its location, charging rate, traffic load, etc). For example, to select an IoT server which is closer to "device 1"304 (i.e. with less number of IP hops), to select an IoT server with lower charging rate, to select an IoT server with lower traffic load, or to select an IoT server which manages other devices within the proximity of device 1.

In step 2 of FIG. 3, "device 1" 304 registers with the IoT server 308 by sending an "IoT Service Registration" request message. During this step, "device 1" 304 informs the IoT server 308 of the address of its proximity manager by embedding it in "IoT Service Registration" message. "Device 1" 304 can also indicate its proximity registration status in this step. Optionally, this step can happen prior to Step 1. In this case, the IoT server 308 can help select an appropriate proximity manager for "Device 1" 304 if it indicates multiple or none of proximity manager in the "IoT Service Registration" request message.

In step 3 of FIG. 3, "device 2" 302 registers with the proximity manager by sending a "Proximity Service Registration" message. During this step, "device 2" 302 informs the proximity manager 306 of the address of its IoT Server 308 by embedding it in proximity registration message. For example, if Device 2 is a 3GPP device, it can optionally store the addresses of both the proximity manager and the IoT server in HSS.

In step 4 of FIG. 3, "device 2" 302 registers with the IoT server 308 by sending an "IoT Service Registration" message. During this step, "device 2" 302 informs the IoT server 308 of the address of its proximity manager by embedding it in an "IoT Service Registration" message. It should be understood that Step 2 of FIG. 3 can occur before Step 1 of FIG. 3. Likewise, step 4 of FIG. 3 can be done before step 3 of FIG. 3.

Figure 16A:
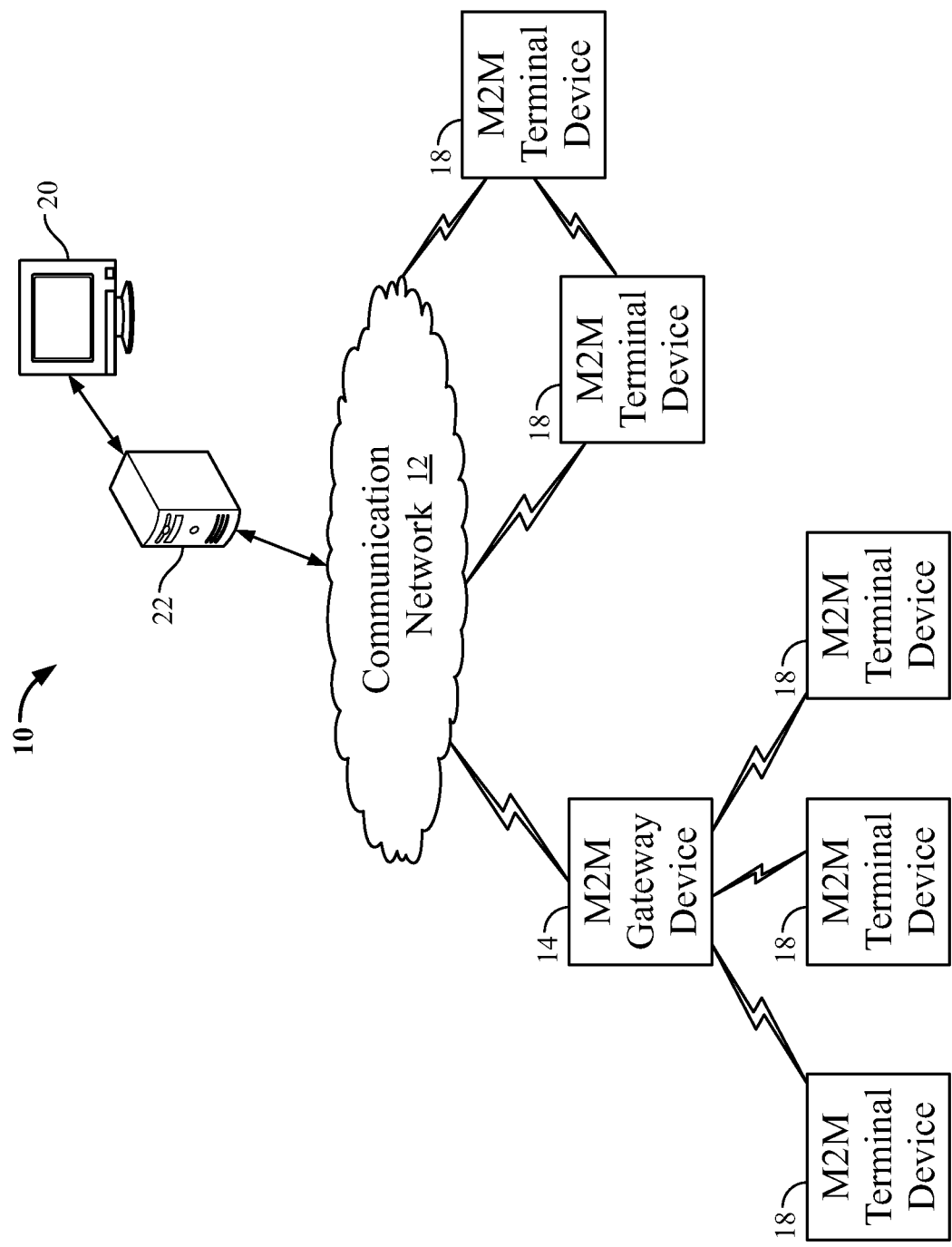
FIG. 16A is a system diagram of an example machine-to-machine (M2M) or Internet of Things (IoT) communication system in which one or more disclosed embodiments may be implemented.
Figure 16B:
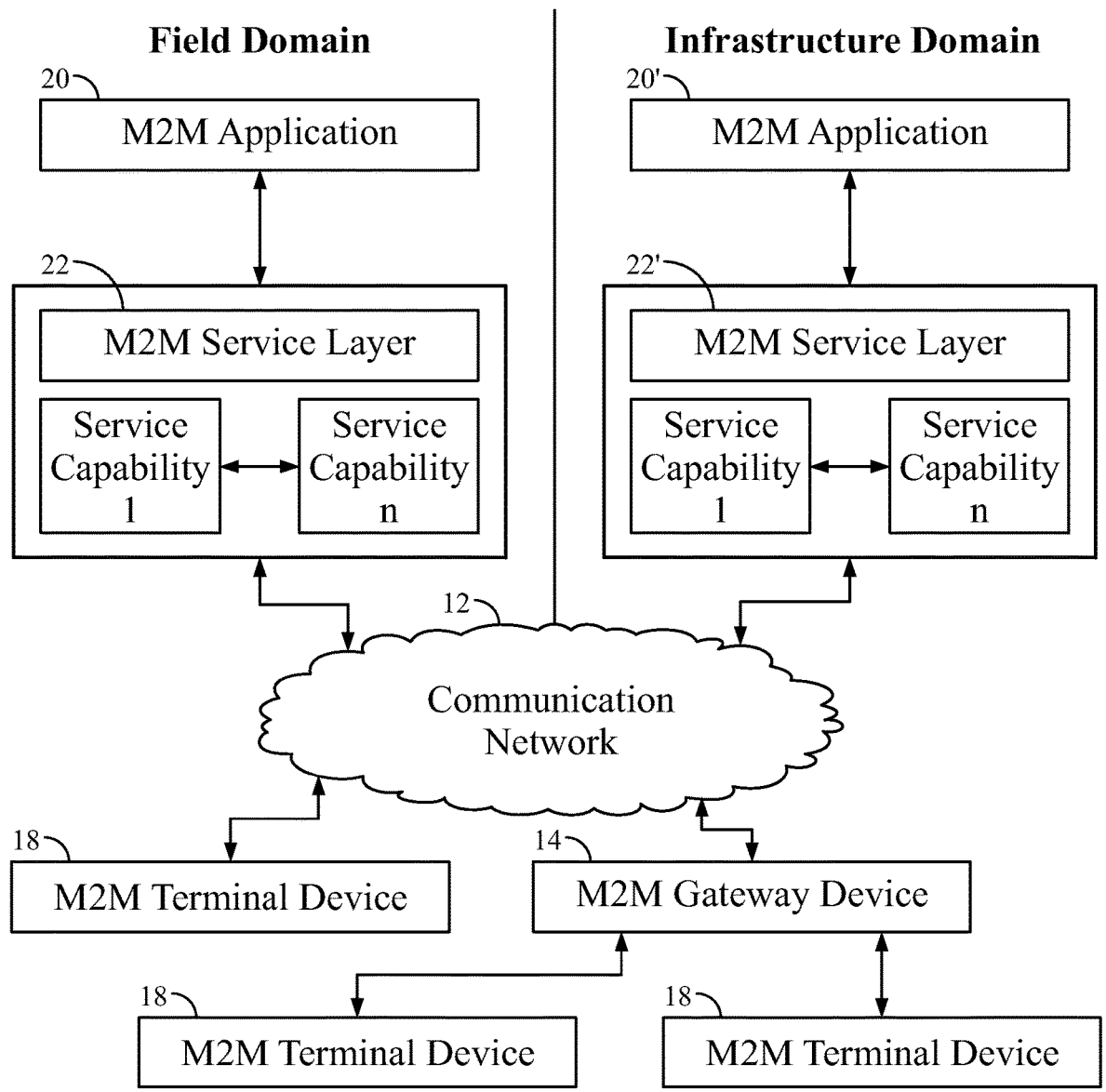
FIG. 16B is a system diagram of an example architecture that may be used within the M2M/IoT communications system illustrated in FIG. 16A.
Figure 16C:
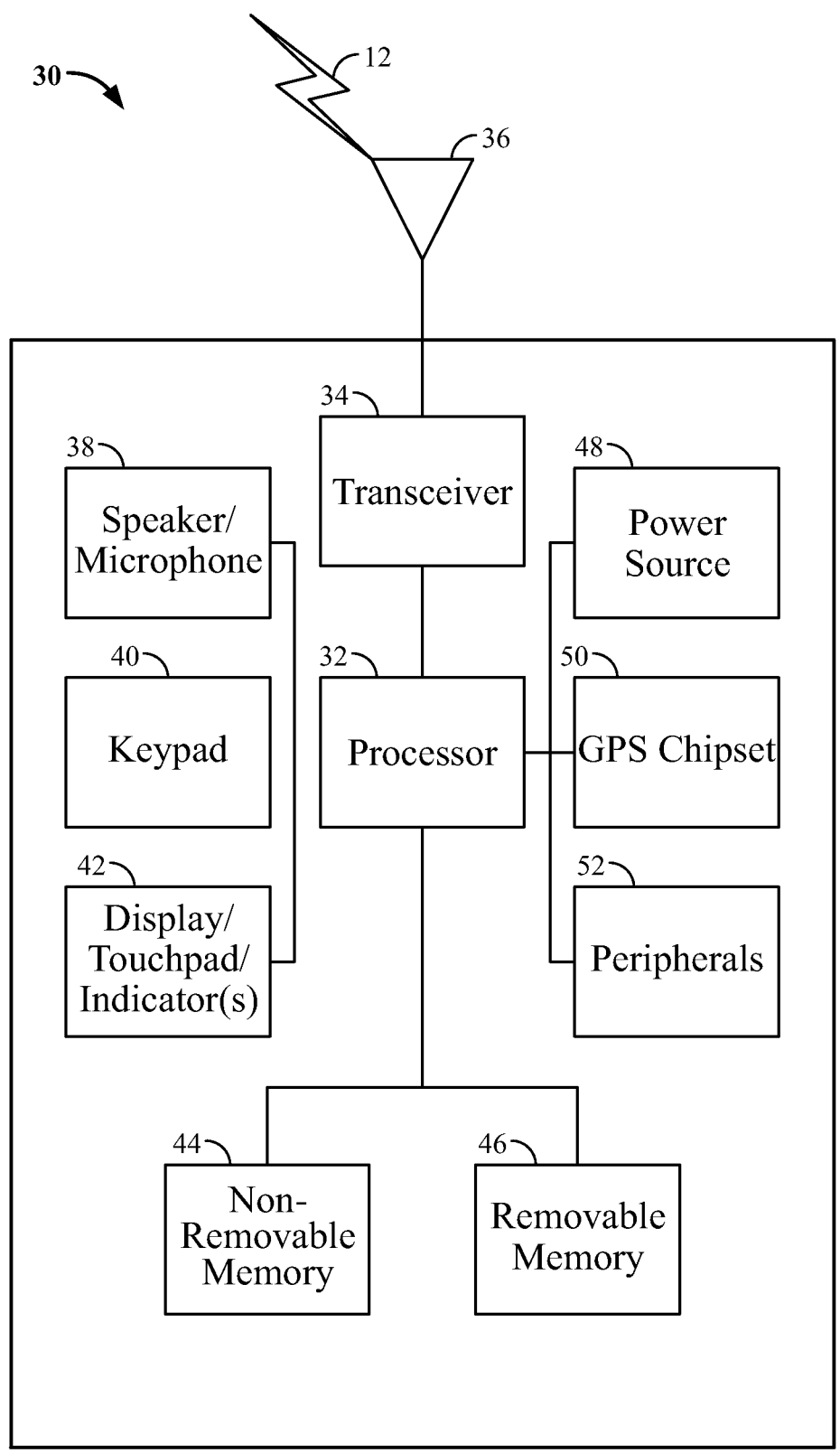
FIG. 16C is a system diagram of an example M2M/IoT terminal or gateway device that may be used within the communications system illustrated in FIG. 16A.
Figure 16D:
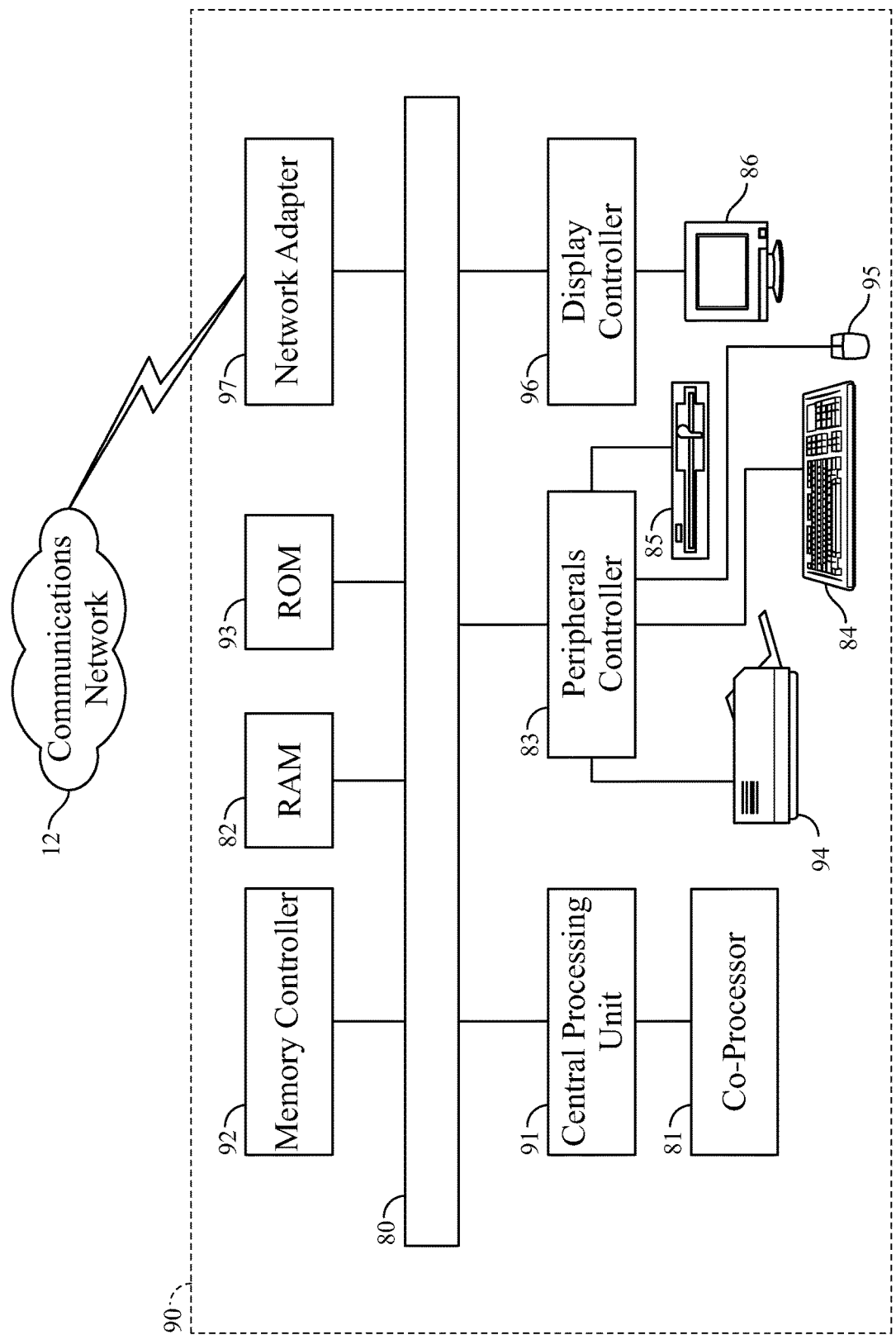
FIG. 16D is a block diagram of an example computing system in which aspects of the communication system of FIG. 16A may be embodied.

It is understood that the entities performing the steps illustrated in FIG. 3 are logical entities that may be implemented in the form of software (i.e., computer-executable instructions) stored in a memory of, and executing on a processor of, a device, server, or other computer system such as one of those illustrated in FIG. 16C or 16D. That is, the method(s) illustrated in FIG. 3 may be implemented in the form of software (i.e., computer-executable instructions) stored in a memory of a computing device, such as for example the device or computer system illustrated in FIGS. 16C or 16D, which computer executable instructions, when executed by a processor of the computing device, perform the steps illustrated in FIG. 3.

Approach 2: IoT-Server-Assisted Registration

Figure 4:
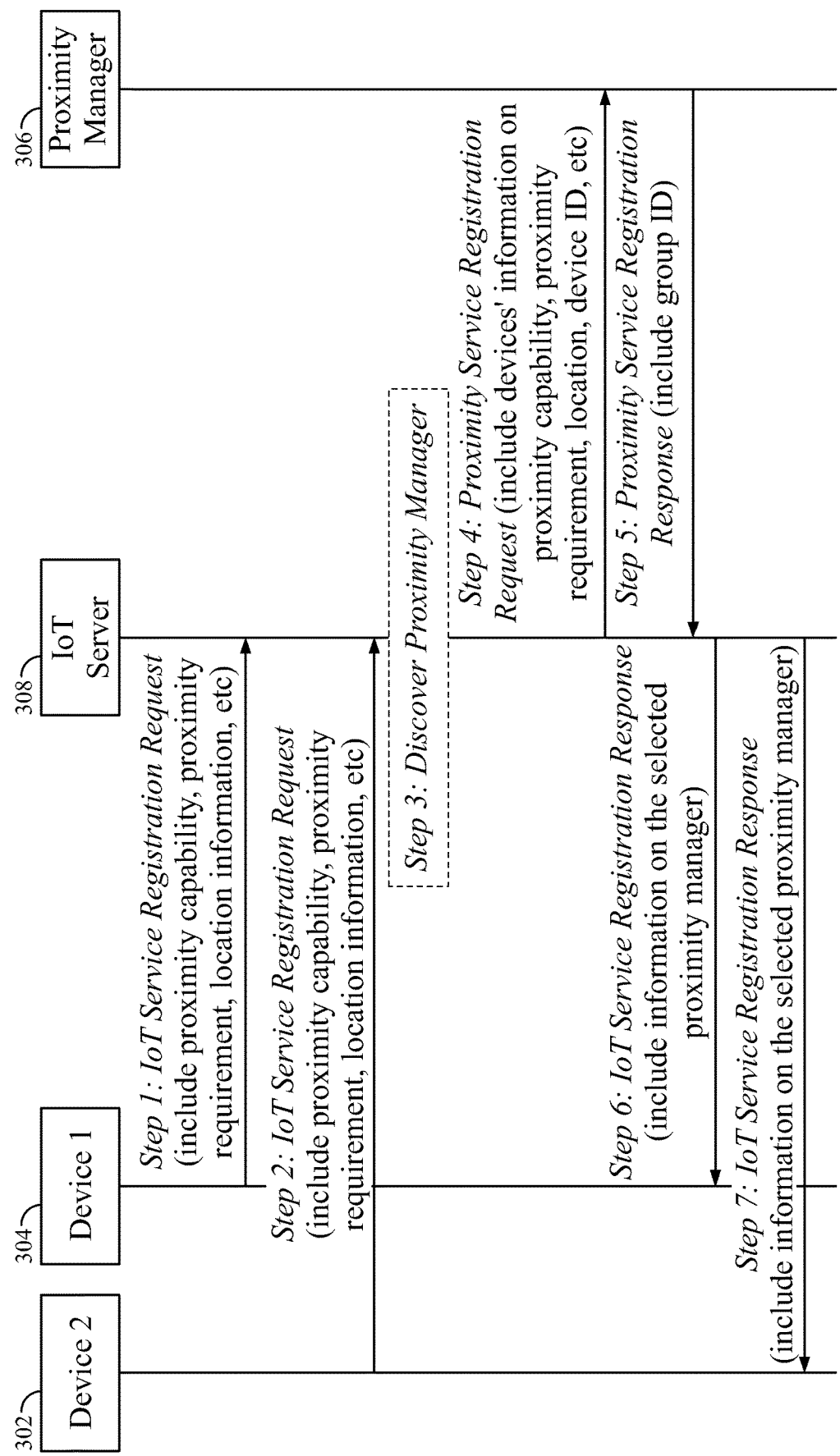
FIG. 4 is a diagram that illustrates an exemplary approach using IoT-server-assisted IoT and proximity service registration.

FIG. 4 illustrates IoT-server-assisted IoT and proximity service registration. In this approach, it is assumed that devices may only know the address of the IoT server 308. The following exemplary steps are proposed.

In step 1 of FIG. 4, "Device 1" 304 sends an "IoT Service Registration Request" message to the IoT Server 308. This message may contain the following fields or parameters:

Device 1's capability for supporting proximity services,
Device 1's requirements on proximity services,
Device 1's location information (e.g. geo-location),
Device 1's attached network.

In step 2 of FIG. 4, "device 2" 302 sends an "IoT Service Registration Request" message to the IoT Server 308. This message may contain the following fields or parameters:

Device 2's capability for supporting proximity services,
Device 2's requirements on proximity services,
Device 2's location information (e.g. geo-location),
Device 2's attached network In step 3 of FIG. 4, the IoT sever 308 performs "Discover Proximity Manager".

The IoT server 308 discovers and identifies an appropriate proximity manager based on device 1& device 2's information reported in step 1 and step 2 of FIG. 4 such as their proximity capability and current location.

For example, if device 1 and 2 moves to a new location or attaches to a different network, a new proximity manager will be selected by the IoT server 308 based on device 1 and 2's current location and attached network. The assumption here is that IoT server 308 may maintain a list of potential proximity managers or leverage IoT discovery service to find appropriate proximity manager. But how to leverage IoT discovery service is out of the scope of this paper.

Alternatively, the IoT server 308 may have a pre-configured proximity manager for all devices it services.

In step 4 of FIG. 4, the IoT server sends a "Proximity Service Registration Request" message to the selected proximity manager. Basically, the IoT server 308 can use this single step to perform proximity service registration for multiple devices, which is more efficient than the device-initiated registration in FIG. 3. This message may contain the following fields or parameters:

- Device 1& device 2's capability for supporting proximity services,
- Device 1& device 2's requirements on proximity services,
- Device 1& device 2's location information (e.g. geo-location)
- Device 1 & device 2's identifier (e.g. URL, MS-ISDN, IP address, etc)

In step 5 of FIG. 4, the proximity manager 306 sends a "Proximity Service Registration Response" to the IoT server 308.

In step 6 of FIG. 4, the IoT server 308 sends an "IoT Service Registration Response" to "device 1" 304. This message can tell if device 1's IoT service registration request is accepted or rejected. The message may indicate if the proximity request is accepted or not based on the response in Step 5 of FIG. 4 or local decision made by the IoT server 308. This message may include the information about the selected proximity manager such as its address (e.g. URL).

In step 7 of FIG. 4, the IoT server 308 sends an "IoT Service Registration Response" to "device 2" 302. This message can tell if device 2's IoT service registration request is accepted or rejected. The message may indicate if the proximity request is accepted or not based on the response in step 5 or local decision made by the IoT server 308. This message may include the information about the selected proximity manager 306 such as its address (e.g. URL).

The IoT server 308 may reject IoT service registration request in step 1 of FIG. 4 (or step 2 of FIG. 4) directly. In this case, steps 3-5 of FIG. 4 may be skipped.

The IoT server 308 may allow IoT service registration, but directly reject proximity request piggybacked in step 2 of FIG. 4. In this case, steps 3-5 of FIG. 4 will be skipped. If none of proximity managers 306 is found in step 3 of FIG. 4, steps 4-5 of FIG. 4 will be skipped. If the IoT server receives "rejection" in step 5 of FIG. 4, it may repeat steps 3-5 of FIG. 4 to find another proximity manager and make registration with it.

After Step 3 of FIG. 4, the IoT server may optionally skip steps 4-5 of FIG. 4 but return the address of the selected proximity manager to "device 1" 304 and "device 2" 302 in step 6 and 7 of FIG. 4, respectively. Then "device 1" 304 and "device 2" 302 can make proximity service registration directly with the selected proximity manager 306.

Optionally, the IoT server 308 may perform steps 4-5 of FIG. 4 sequentially for each device (i.e. "device 1" 304 and "device 2" 302 in FIG. 4).

Optionally, the IoT server 308 can first send simple IoT service registration response without proximity manager info for Step 1 of FIG. 4 (or Step 2 of FIG. 4) to Device 1 (or Device 2) before Step 3 of FIG. 4 without waiting for Step 4 and Step 5 of FIG. 4.

In this step, the IoT server 308 could tell "device 1" 304 and "device 2" 302 that they do not need to send proximity service registration request to the proximity manager 306 since it will forward the aggregated request to the proximity manger.

It is understood that the entities performing the steps illustrated in FIG. 4 are logical entities that may be implemented in the form of software (i.e., computer-executable instructions) stored in a memory of, and executing on a processor of, a device, server, or other computer system such as one of those illustrated in FIG. 16C or 16D. That is, the method(s) illustrated in FIG. 4 may be implemented in the form of software (i.e., computer-executable instructions) stored in a memory of a computing device, such as for example the device or computer system illustrated in FIGS. 16C or 16D, which computer executable instructions, when executed by a processor of the computing device, perform the steps illustrated in FIG. 4.

Approach 3: Proximity-Manager-Assisted Registration

Figure 5:
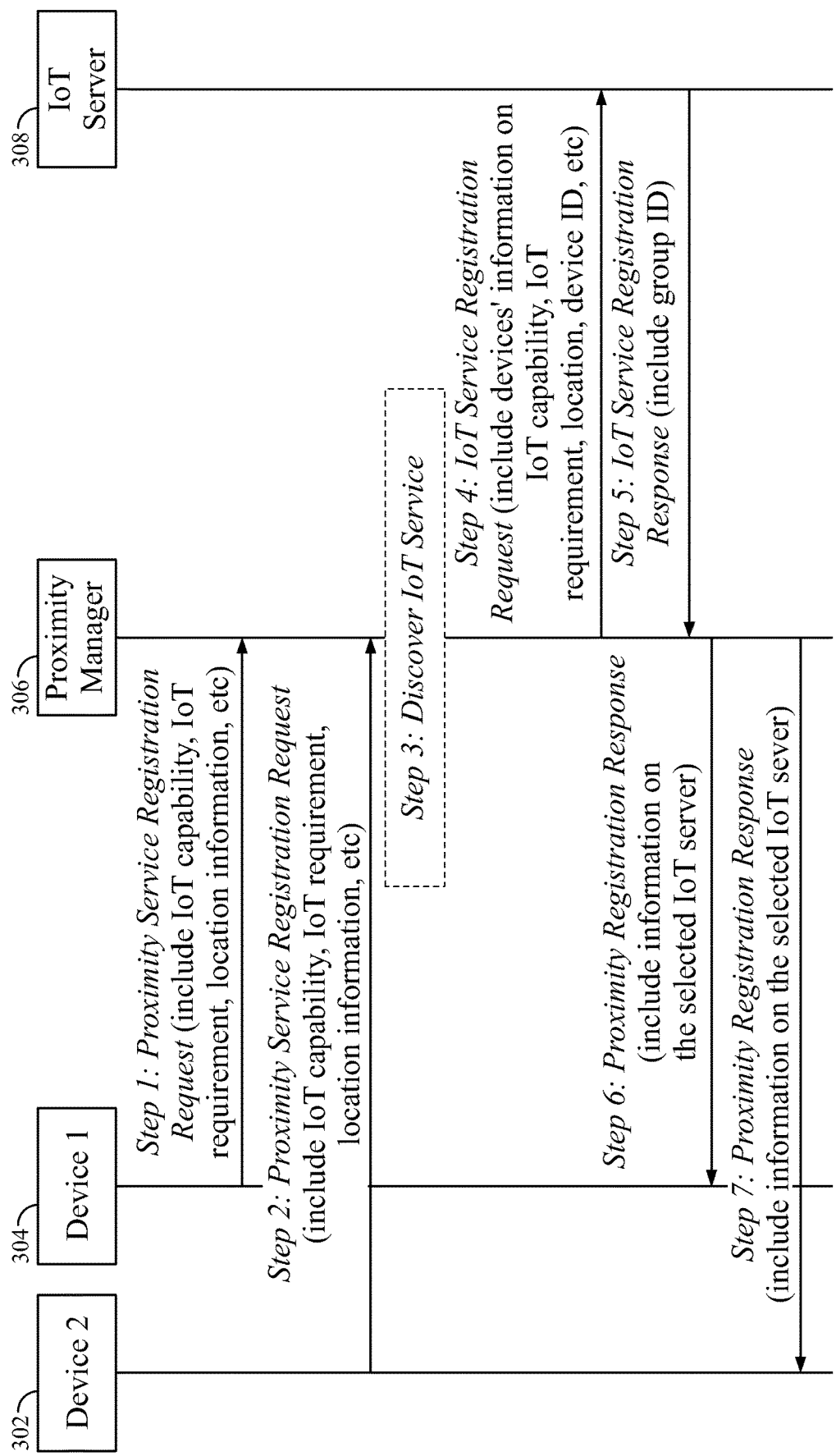
FIG. 5 is a diagram that illustrates an exemplary approach using proximity-manager-assisted IoT and proximity service registration.

FIG. 5 illustrates proximity-manager-assisted IoT and proximity service registration. In this approach, it is assumed that devices may only know the address of the proximity manager 306. The following exemplary steps are proposed.

In step 1 of FIG. 5, "device 1" 304 sends a "Proximity Service Registration Request" message to the proximity manager. This message may contain the following fields or parameters:

- Device 1's capability for supporting IoT services,
- Device 1's requirements on IoT services,
- Device 1's location information (e.g. geo-location)

In step 2 of FIG. 5, "device 2" 302 sends a "Proximity Service Registration Request" message to the proximity manager. This message may contain the following fields or parameters:

- Device 2's capability for supporting IoT services,
- Device 2's requirements on IoT services,
- Device 2's location information (e.g. geo-location)

In step 3 of FIG. 5, the proximity manager 306 performs a "Discover IoT Server" step. The proximity manager 306 discovers and identifies an appropriate IoT server 308 based on device 1& device 2's information reported in step 1 and 2 such as their IoT capability and current location. Alternatively, the proximity manager 306 may have a pre-configured IoT server for all devices it services.

In step 4 of FIG. 5, the proximity manager 306 sends an "IoT Service Registration Request" message to the selected IoT server 308. Basically, the proximity manager 306 can use this single step to perform IoT service registration for multiple devices, which is more efficient than the device-initiated registration in FIG. 3. This message may contain the following fields or parameters:

- Device 1& device 2's capability for supporting IoT services,
- Device 1 & device 2's requirements on IoT services,
- Device 1& device 2's location information (e.g. geo-location)
- Device 1 & device 2's identifier (e.g. URL, MS-ISDN, IP address, etc)

In step 5 of FIG. 5, the IoT server 308 sends an "IoT Service Registration Response" to the proximity manager. This message will tell the proximity manager if the request in step 4 of FIG. 5 is accepted or rejected. If step 4 of FIG. 5 is for multiple devices (e.g. device 1 and device 2), the IoT server 308 may indicate which device is accepted and which device is rejected. The IoT server 308 may assign a group ID for the devices as requested in step 4 of FIG. 5. As a result, this message may contain this group ID.

In step 6 of FIG. 5, the proximity manager 306 sends a "Proximity Service Registration Response" to "device 1" 304. This message will tell if device 1's proximity service registration request is accepted or rejected. The message may indicate if the IoT registration request is accepted or not based on the response in Step 5 or local decision made by the IoT server. This message may include the information about the selected IoT server such as its address (e.g. URL).

In step 7 of FIG. 5, the proximity manager 306 sends a "Proximity Service Registration Response" to "device 2" 302. This message will tell if device 2's proximity service registration request is accepted or rejected. The message may indicate if the IoT registration request is accepted or not based on the response in Step 5 of FIG. 5 or local decision made by the IoT server 308. This message may include the information about the selected IoT server 308 such as its address (e.g. URL).

The proximity manager 306 may reject proximity service registration request in step 1 of FIG. 5 (or step 2 of FIG. 5) directly. In this case, steps 3-5 of FIG. 5 may be skipped. The proximity manager 306 may allow proximity service registration, but directly reject IoT registration request piggybacked in step 2 of FIG. 5. In this case, steps 3-5 of FIG. 5 will be skipped. If none of IoT servers 308 is found in step 3 of FIG. 5, steps 4-5 of FIG. 5 will be skipped.

If the proximity manager 306 receives "rejection" in step 5 of FIG. 5, it may repeat steps 3-5 of FIG. 5 to find another IoT server 308 and make registration with it.

After Step 3 of FIG. 5, the proximity manager 306 may optionally skip steps 4-5 of FIG. 5 but return the address of the selected IoT server 308 to "device 1" 304 and "device 2" 302 in steps 6 and 7 of FIG. 5, respectively. Then "device 1" 304 and "device 2" 302 can make IoT service registration directly with the selected IoT server 308.

Optionally, the proximity manager 306 may perform steps 4-5 of FIG. 5 sequentially for each device (i.e. "device 1" 304 and "device 2" 302 in FIG. 5).

In Step 3 of FIG. 5, the Proximity Manager 306 may find that "device 1" 304 and "device 2" 302 correspond to two different IoT servers (e.g. A and B). Then Step 4 and 5 of FIG. 5 will be repeated for both IoT servers A and B.

Optionally, the proximity manager 306 can first send a simple proximity registration response without IoT server info for Step 1 of FIG. 5 (or Step 2 of FIG. 5) to "device 1" 304 (or "device 2" 302) before Step 3 of FIG. 5 without waiting for Step 4 and Step 5 of FIG. 5.

It is understood that the entities performing the steps illustrated in FIG. 5 are logical entities that may be implemented in the form of software (i.e., computer-executable instructions) stored in a memory of, and executing on a processor of, a device, server, or other computer system such as one of those illustrated in FIG. 16C or 16D. That is, the method(s) illustrated in FIG. 5 may be implemented in the form of software (i.e., computer-executable instructions) stored in a memory of a computing device, such as for example the device or computer system illustrated in FIGS. 16C or 16D, which computer executable instructions, when executed by a processor of the computing device, perform the steps illustrated in FIG. 5.

Joint IoT Service and Proximity Service De-Registration

Approach 1: Device-Initiated De-Registration

Figure 6A:
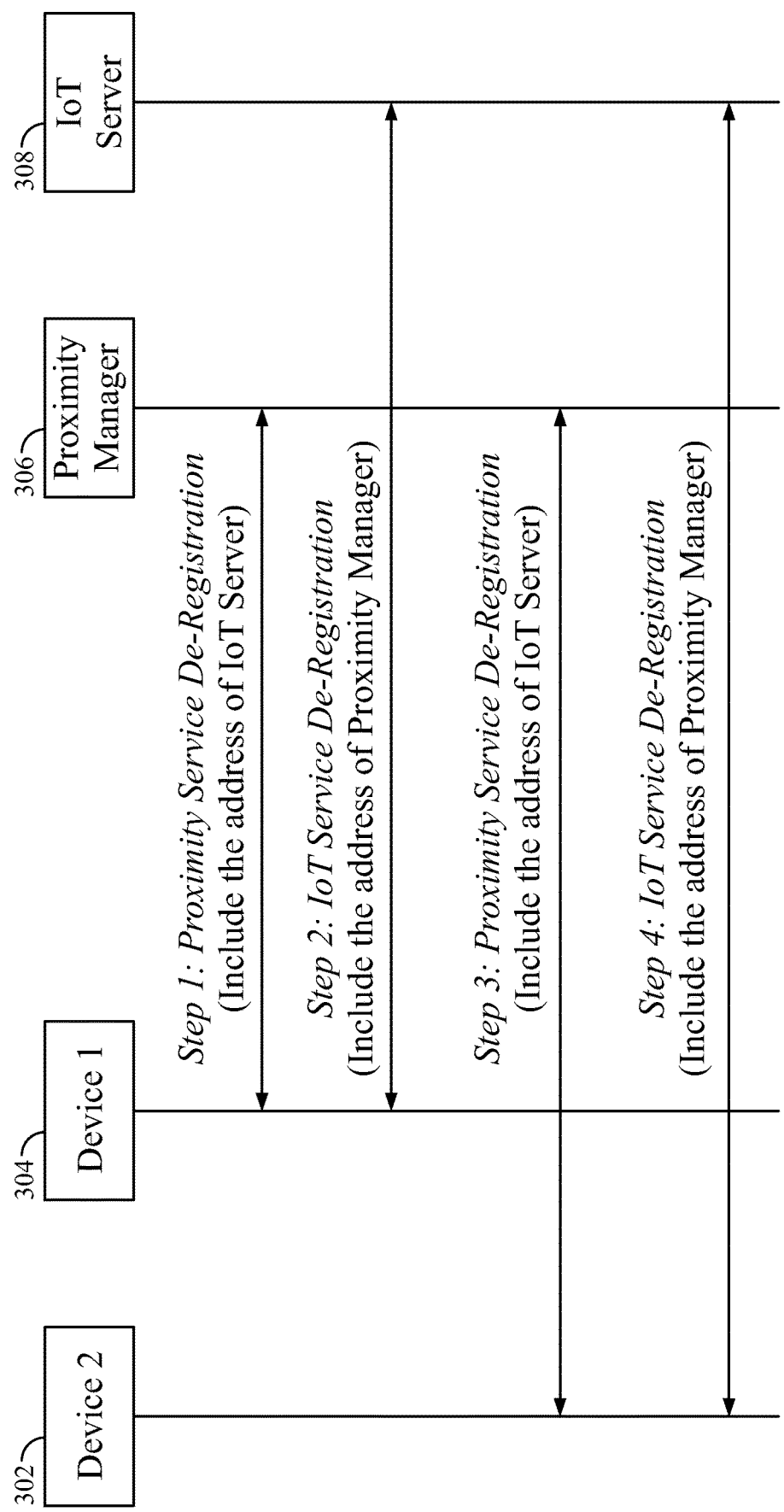
FIG. 6A, 6B and 6C are diagrams that illustrate exemplary approaches for IoT and proximity service de-registration.
Figure 6B:
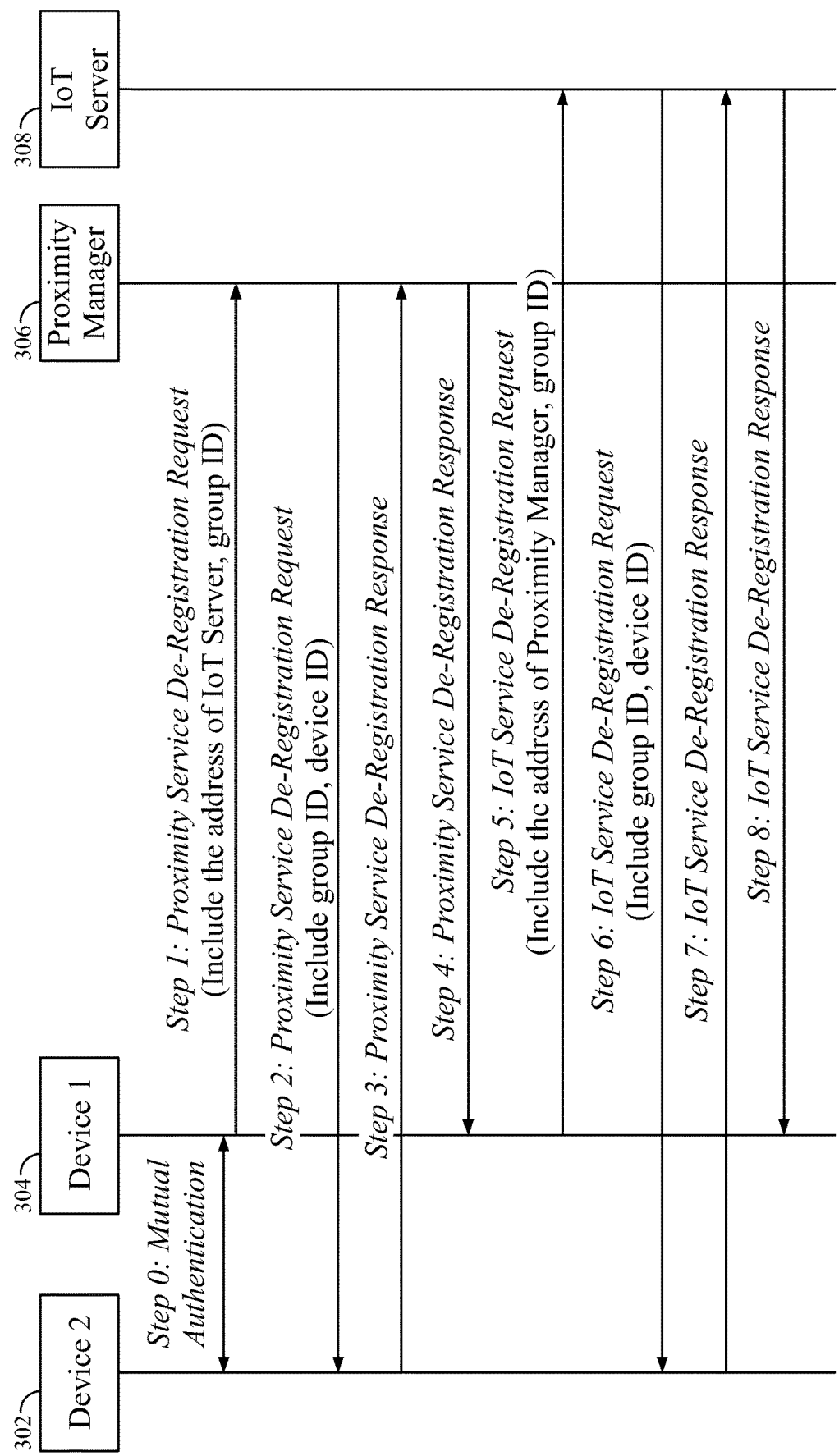
Figure 6C:
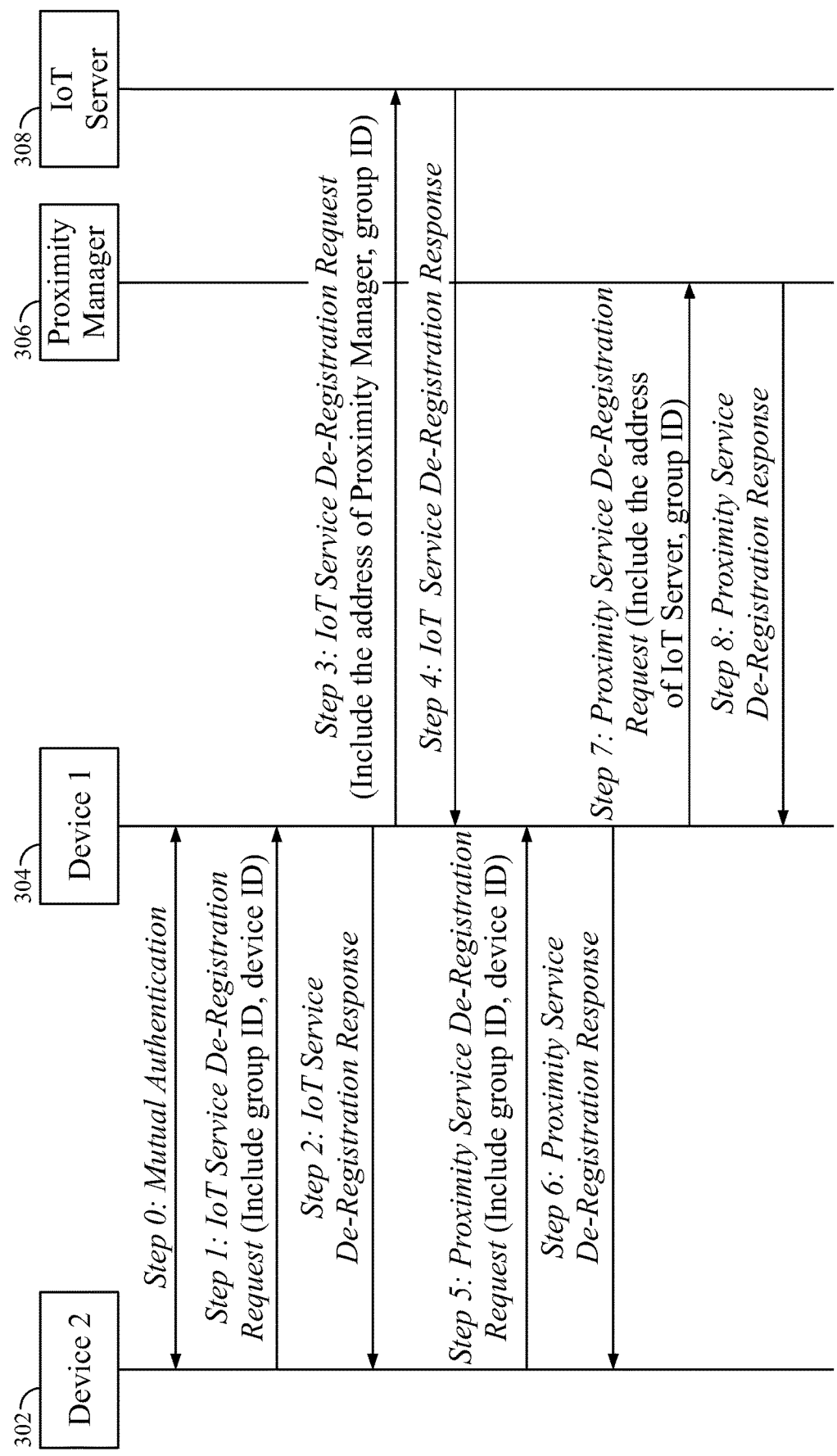

A proposed first approach for IoT and proximity service de-registration procedures is shown in FIGS. 6A-C. In this approach, it is assumed that devices know the address of both the proximity manager 306 and the IoT Server 308 due to previous service registration. In FIG. 6A, each device independently performs service de-registration; in FIG. 6B, one device's service de-registration can trigger service de-registration for other devices; in FIG. 6C, one device can assist other devices within the same proximity to conduct IoT service de-registration and also can trigger proximity service de-registration directly to other devices.

FIG. 6A includes the following exemplary steps.

In step 1 of FIG. 6A, "device 1" 304 sends a "Proximity Service De-Registration" message. During this step, "device 1" 304 informs the proximity manager 306 of the address of its IoT Server 308 by embedding it in this message.

Then the proximity manager 306 may inform the IoT server 308 that the direct communications between "device 1" 304 and other involved devices are cancelled in a separate step which is not shown in FIG. 6, so that the IoT server 308 can automatically adjust the communications between "device 1" 304 and other devices.

In step 2 of FIG. 6A, "device 1" 304 sends an "IoT Service De-Registration" message. During this step, device 1 informs the IoT server 308 of the address of its proximity manager 306 by embedding it in this message. The IoT server 308 may inform the proximity manager 306 that the IoT services on "device 1" 304 are cancelled in a separate step which is not shown in FIG. 6.

In step 3 of FIG. 6A, "device 2" 302 sends a "Proximity Service De-Registration" message. During this step, "device 1" 304 informs the proximity manager 306 of the address of its IoT server 308 by embedding it in this message. Then the proximity manager 306 may inform the IoT server 308 that the direct communications between "device 2" 302 and other involved devices are cancelled in a separate step which is not shown in FIG. 6, so that the IoT server 308 can automatically adjust the communications between "device 2" 302 and other devices.

In step 4 of FIG. 6A, "device 2" 302 sends an "IoT Service De-Registration" message. During this step, "device 1" 304 informs the IoT server 308 of the address of its proximity manager 306 by embedding it in this message. The IoT server 308 may inform the proximity manager 306 that the IoT services on "device 2" 302 are cancelled in a separate step which is not shown in FIG. 6. Step 1 of FIG. 6A may occur after Step 2 of FIG. 6A. Step 3 of FIG. 6A may occur after Step 4 of FIG. 6A as well.

FIG. 6B shows the following exemplary steps.

In step 0 of FIG. 6B, "device 2" 302 and "device 1" 304 perform mutual authentication and authorization. Then trust relationship can be established between "device 1" 304 and "device 2" 302 so that "device 1" 304 can perform service de-registration on behalf of "device 2" 302. This step is optional and can be skipped if "device 1" 304 and device 2 are currently authenticated each other already.

In step 1 of FIG. 6B, "device 1" 304 sends a "Proximity Service De-Registration Request" message to the proximity manager 306. This message may contain the following fields or parameters:

The address of the IoT server 308
The group ID which "device 1" 304 and other devices belong to
De-registration reason In step 2 of FIG. 6B, Based on the "group ID" contained in step 1, the proximity manager 306 locates other devices within the same group and sends a "Proximity Service De-Registration Request" to each of them. This message may contain:

The group ID which is the same as that in step 1.
Device ID (i.e. "device 1" 304 in this case)
De-registration reason which is the same as that in step 1

In step 3 of FIG. 6B, "device 2" 302 sends a response back to the proximity manager 306

In step 4 of FIG. 6B, Step 2 and 3 of FIG. 6B may be repeated for all other devices within the same group. Based on responses from other devices, the proximity manager 306 sends the final response to the requesting device (i.e. "device 1" 304). The message may contain list of devices which explicitly send response.

Step 4 of FIG. 6B can happen between Step 1 and Step 2 of FIG. 6B.

In step 5 of FIG. 6B, "device 1" 304 sends an "IoT Service De-Registration Request" message to the IoT server 308. This message may contain the following fields or parameters:
- The address of the proximity manager 306
- The group ID which "device 1" 304 and other devices belong to
- De-registration reason In step 6 of FIG. 6B, Based on the "group ID" contained in step 1 of FIG. 6B, the IoT server 308 locates other devices within the same group and sends an "IoT Service De-Registration Request" to each of them. This message may contain:
- The group ID which is the same as that in step 1 of FIG. 6B.
- De-registration reason which is the same as that in step 1 of FIG. 6B
- Requesting device ID (i.e. "device 1" 304 in this case)

In step 7 of FIG. 6B, "device 2" 302 sends a response back to the IoT server 308.

In step 8 of FIG. 6B, Steps 2 and 3 of FIG. 6B may be repeated for all other devices within the same group. Based on responses from other devices, the IoT server 308 sends the final response to the requesting device (i.e. "device 1" 304). The message may contain the list of devices which explicitly send response.

Devices can perform de-registration with the IoT server 308 first. In this case, Steps 5-8 of FIG. 6B will occur before Steps 1-4 of FIG. 6B.

FIG. 6C shows the following exemplary steps.

In step 0 of FIG. 6C, "device 2" 302 and "device 1" 304 perform mutual authentication and authorization. Then trust relationship can be established between "device 1" 304 and "device 2" 302 so that "device 1" 304 can perform service de-registration on behalf of "device 2" 302.

In step 1 of FIG. 6C, "device 2" 302 sends an "IoT Service De-Registration Request" message to "device 1" 304. During this step, "device 2" 302 informs the "device 1" 304 of its device ID and group ID by embedding them in this message. Then, "device 1" 304 can help to perform IoT service de-registration on behalf of all devices in the group as denoted by Group ID (e.g. "device 2" 302, "device 1" 304) in the following steps.

In step 2 of FIG. 6C, "device 1" 304 sends an "IoT Service De-Registration Response" to "device 2" 302. It should be understood that Step 2 of FIG. 6C can optionally occur after Step 4 of FIG. 6C.

In step 3 of FIG. 6C, "device 1" 304 sends an "IoT Service De-Registration Request" to IoT server 308 . This message may contain the following information:
- The address of the corresponding Proximity manager 306
- The group ID of "device 1" 304 and "device 2" 302

In step 4 of FIG. 6C, IoT server 308 sends back "IoT Service De-Registration Response" back to "device 1" 304 .

In step 5 of FIG. 6C, "device 2" 302 sends a "Proximity Service De-Registration Request" message to "device 1" 304 . During this step, "device 2" 302 informs the "device 1" 304 of its device ID and group ID by embedding them in this message. Then, "device 1" 304 can help to perform proximity service de-registration on behalf of all devices in the group as denoted by Group ID (e.g. "device 2" 302, "device 1" 304) in the following steps.

In step 6 of FIG. 6C, "device 1" 304 sends a "Proximity Service De-Registration Response" to "device 2" 302. Step 6 of FIG. 6C can optionally occur after Step 8 of FIG. 6C.

In step 7 of FIG. 6C, "device 1" 304 sends a "Proximity Service De-Registration Request" to Proximity manager 306. This message may contain the following information:
- The address of the corresponding IoT server 308
- The group ID of "device 1" 304 and "device 2" 302

In step 8 of FIG. 6C, Proximity manager 306 sends a "Proximity Service De-Registration Response" back to "device 1" 304 .

Devices can perform de-registration with the proximity manager 306 first. In that case, Steps 5-8 of FIG. 6C will occur before Steps 1-4 of FIG. 6C.

It is understood that the entities performing the steps illustrated in FIGS. 6A-C are logical entities that may be implemented in the form of software (i.e., computer-executable instructions) stored in a memory of, and executing on a processor of, a device, server, or other computer system such as one of those illustrated in FIG. 16C or 16D. That is, the method(s) illustrated in FIG. 6A-C may be implemented in the form of software (i.e., computer-executable instructions) stored in a memory of a computing device, such as for example the device or computer system illustrated in FIGS. 16C or 16D, which computer executable instructions, when executed by a processor of the computing device, perform the steps illustrated in FIGS. 6A-C.

Approach 2: IoT-Server-Assisted De-Registration

Figure 7:
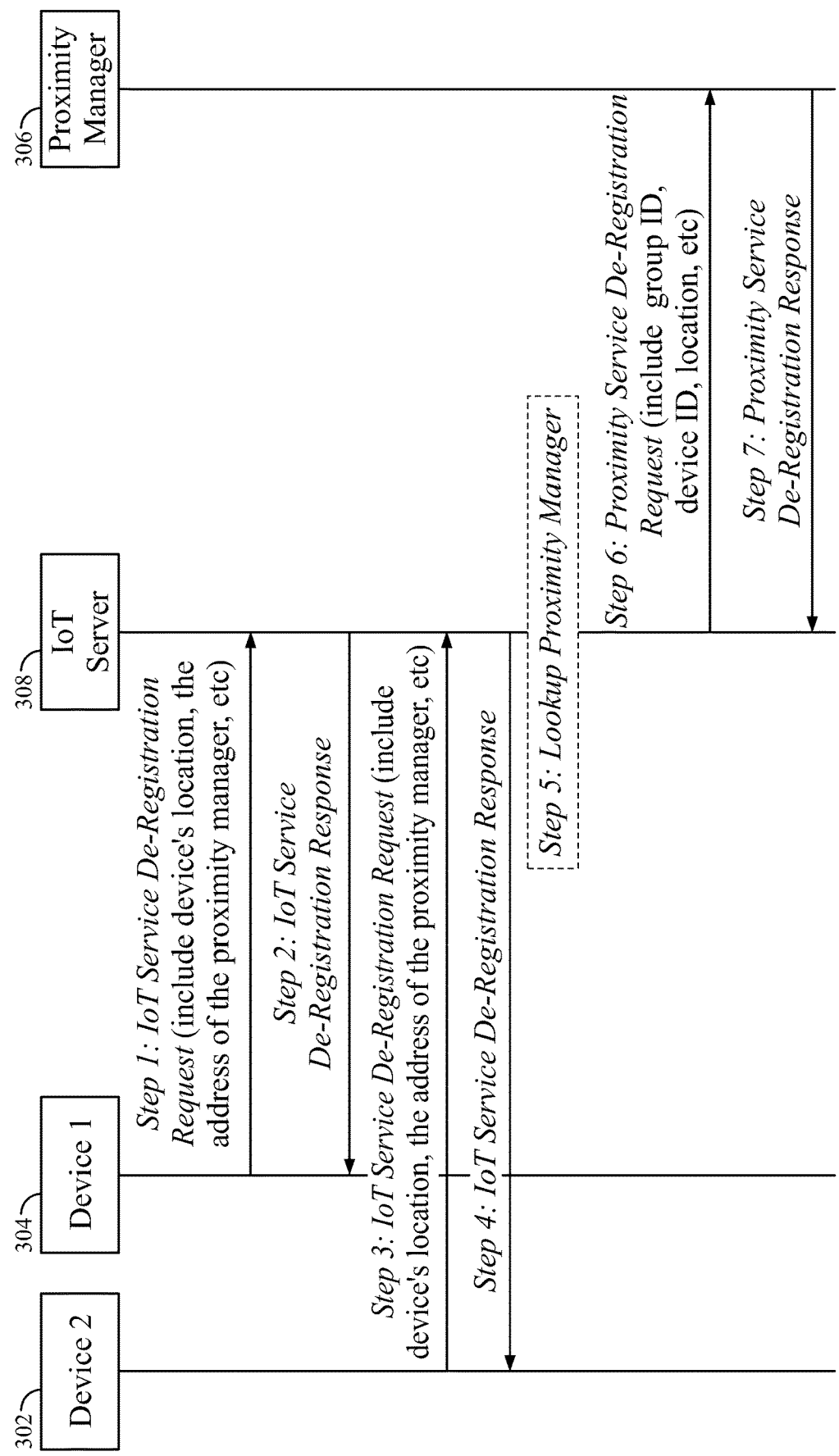
FIG. 7 is a diagram that illustrates an exemplary approach for IoT-server-assisted IoT and proximity service de-registration.

FIG. 7 illustrates IoT-server-assisted IoT and proximity service de-registration. In this approach, it is assumed that devices may only know the address of the IoT server 308 . The following exemplary steps are proposed.

In step 1 of FIG. 7, "device 1" 304 sends an "IoT Service De-Registration Request" message to the IoT server 308 . This message may contain the following fields or parameters:
- Device 1's location information (e.g. geo-location)
- The address of the proximity manager 306
- De-registration reason In step 2 of FIG. 7, the IoT server 308 sends a response back to "device 1" 304

In step 3 of FIG. 7, "device 2" 302 sends an "IoT Service De-Registration Request" message to the IoT server 308 . This message may contain the following fields or parameters:
- Device 2's location information (e.g. geo-location)
- The address of the proximity manager 306
- De-registration reason In step 4 of FIG. 7, the IoT server 308 sends a response back to "device 2" 302.

In step 5 of FIG. 7, The IoT should know the address of the corresponding proximity manager 306 via the previous procedures. If not, it can look up its local database to find the corresponding proximity manager 306 for "device 1" 304 and "device 2" 302.

In step 6 of FIG. 7, The IoT server 308 sends a "Proximity Service De-Registration Request" message to the corresponding proximity manager. Basically, the IoT server 308 can use this single step to perform proximity service de-registration for multiple devices, which is more efficient than the device-initiated de-registration in FIG. 6. This message may contain the following fields or parameters:
- Group identifier which "device 1" 304 and "device 2" 302 belong to.

Device 1 and device 2's identifier (e.g. URL, MS-ISDN, IP address, etc)

De-registration reason

In step 7 of FIG. 7, the proximity manager 306 sends a "Proximity Service De-Registration Response" to the IoT server 308. Using the same idea in FIG. 6 (b), "device 1" 304, during Step 1 and 2, can request the IoT server 308 to contact "device 2" 302 and the proximity manager 306 to trigger de-registration. In this case, Step 3 will be triggered and initiated by the IoT server 308.

It is understood that the entities performing the steps illustrated in FIG. 7 are logical entities that may be implemented in the form of software (i.e., computer-executable instructions) stored in a memory of, and executing on a processor of, a device, server, or other computer system such as one of those illustrated in FIG. 16C or 16D. That is, the method(s) illustrated in FIG. 7 may be implemented in the form of software (i.e., computer-executable instructions) stored in a memory of a computing device, such as for example the device or computer system illustrated in FIGS. 16C or 16D, which computer executable instructions, when executed by a processor of the computing device, perform the steps illustrated in FIG. 7.

Approach 3: Proximity-Manager-Assisted De-Registration

Figure 8:
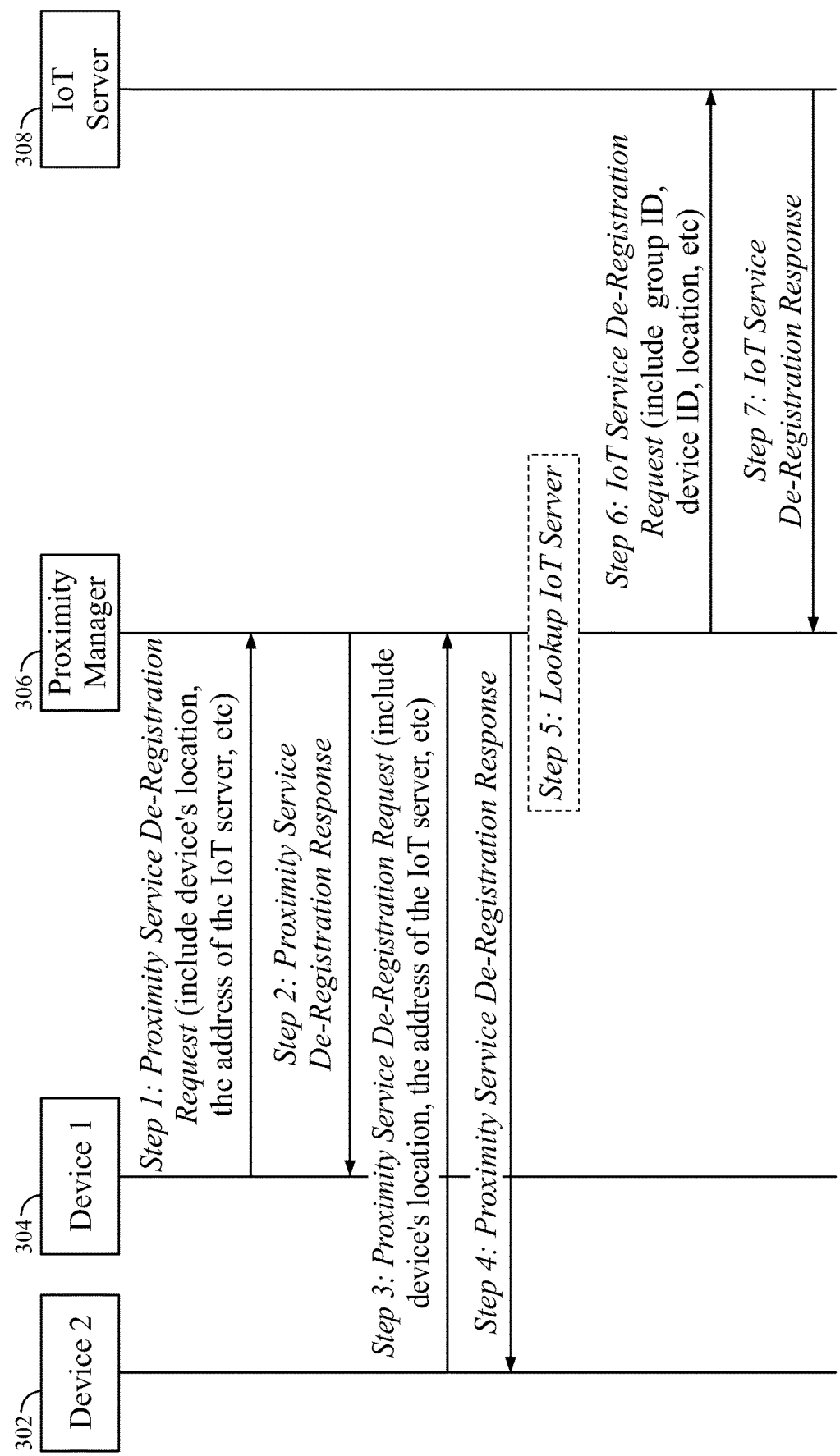
FIG. 8 is a diagram that illustrates an exemplary approach for proximity-manager-assisted IoT and proximity service de-registration.

FIG. 8 illustrates proximity-manager-assisted IoT and proximity service de-registration. In this approach, it is assumed that devices may only know the address of the proximity manager 306. The following exemplary steps are proposed.

In step 1 of FIG. 8, "device 1" 304 sends a "Proximity Service De-Registration Request" message to the proximity manager 306. This message may contain the following fields or parameters:

"device 1" 304's location information (e.g. geo-location)

The address of the IoT server 308

De-registration reason

In step 2 of FIG. 8, the proximity manager 306 sends a response back to "device 1" 304.

In step 3 of FIG. 8, "device 2" 302 sends a "Proximity Service De-Registration Request" message to the proximity manager 306. This message may contain the following fields or parameters:

Device 2's location information (e.g. geo-location)

The address of the IoT server 308

De-registration reason

In step 4 of FIG. 8, the proximity manager 306 sends a response back to "device 2" 302.

In step 5 of FIG. 8, the proximity manager 306 should know the address of the corresponding IoT server 308 via the previous procedures. If not, it may look up its local database to find the corresponding IoT server 308 for "device 1" 304 and "device 2" 302.

In step 6 of FIG. 8, the proximity manager 306 sends an "IoT Service De-Registration Request" message to the corresponding IoT server 308. Basically, the proximity manager 306 can use this single step to perform IoT service de-registration for multiple devices, which is more efficient than the device-initiated de-registration in FIG. 6. This message may contain the following fields or parameters:

Group identifier which "device 1" 304 and "device 2" 302 belong to.

Device 1 and device 2's identifier (e.g. URL, MS-ISDN, IP address, etc)

De-registration reason

In step 7 of FIG. 8, the IoT server 308 sends an "IoT Service De-Registration Response" to the proximity manager 306. Using the same idea in FIG. 6 (b), "device 1" 304, during Step 1 and 2, can request the proximity manager 306 to contact "device 2" 302 and the IoT server 308 to trigger de-registration. In this case, Step 3 will be triggered and initiated by the proximity manager 306.

It is understood that the entities performing the steps illustrated in FIG. 8 are logical entities that may be implemented in the form of software (i.e., computer-executable instructions) stored in a memory of, and executing on a processor of, a device, server, or other computer system such as one of those illustrated in FIG. 16C or 16D. That is, the method(s) illustrated in FIG. 8 may be implemented in the form of software (i.e., computer-executable instructions) stored in a memory of a computing device, such as for example the device or computer system illustrated in FIGS. 16C or 16D, which computer executable instructions, when executed by a processor of the computing device, perform the steps illustrated in FIG. 8.

Approach 4: IoT-Server-Initiated De-Registration

The IoT server 308 can initiate proximity service de-registration based on certain policies. For example, if its traffic load becomes light, the IoT server 308 can de-activate proximity services. In the second example, the IoT server 308 may like to onload IoT traffic for better security control. In the third example, the IoT server 308 may find that the current proximity manager 306 becomes unreliable or unsecure and cancel proximity services.

Figure 9A:
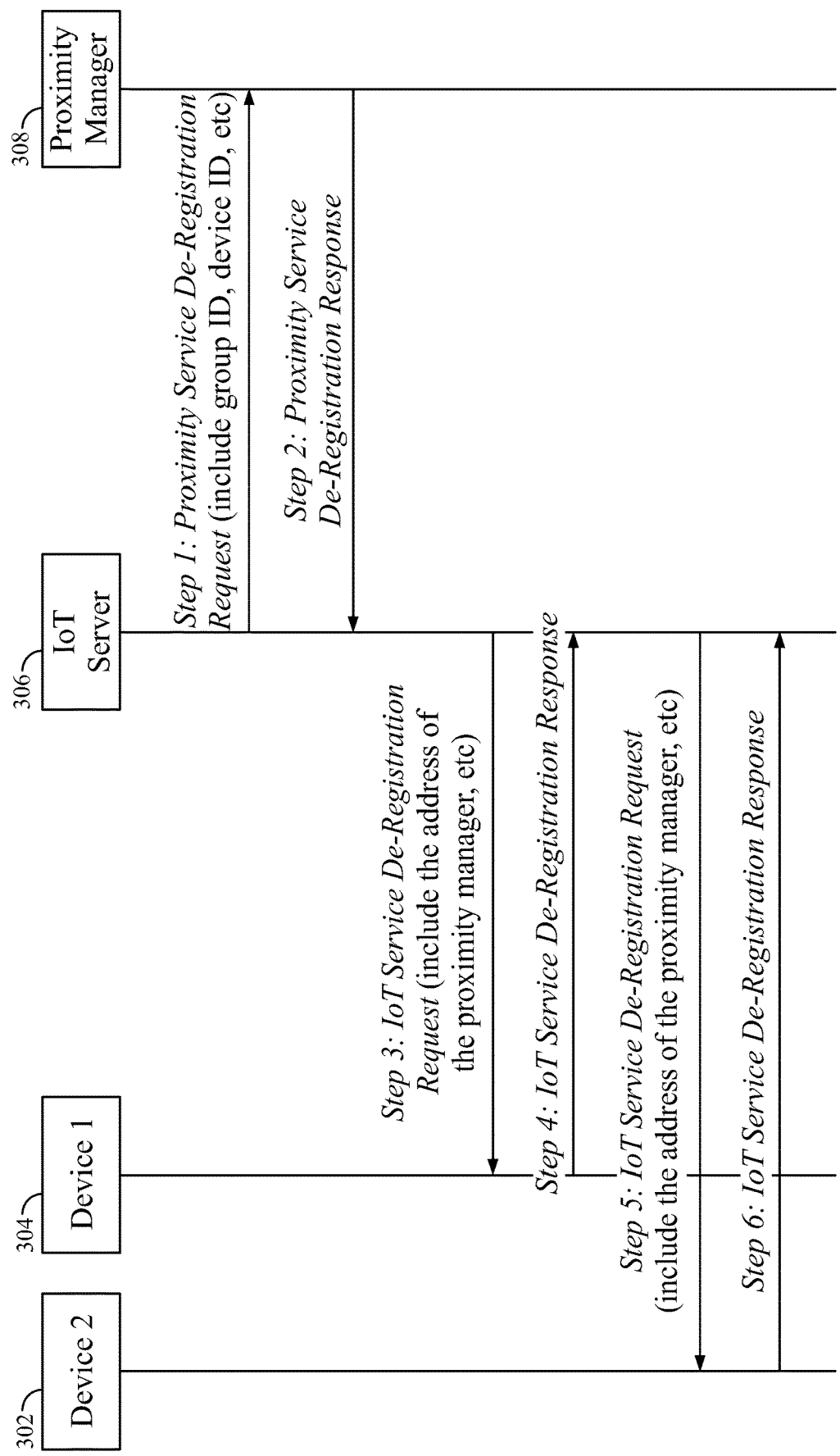
FIGS. 9A and 9B are diagrams that illustrate exemplary approaches for IoT-server-initiated de-registration.
Figure 9B:
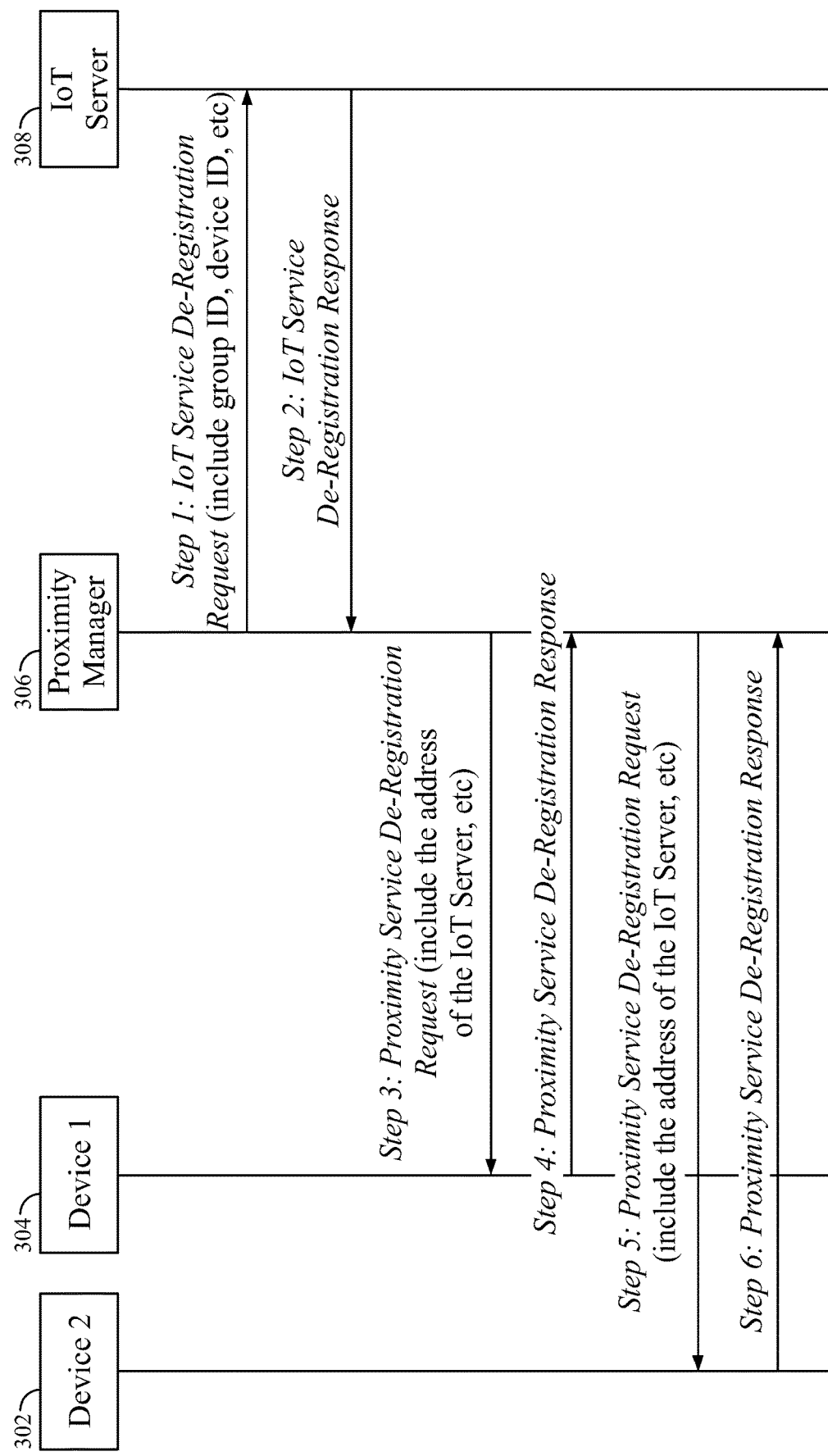

FIGS. 9A-B illustrates the procedures for IoT-server-initiated de-registration. In FIG. 9A, the IoT server 308 initiates and plays as a proxy to perform de-registration for multiple devices. For example, FIG. 9A shows the following exemplary steps, which works as follows:

In step 1 of FIG. 9A, the IoT server 308 decides to perform proximity service de-registration for some devices by sending a "Proximity Service De-Registration Request" message to the corresponding proximity manager 306. The IoT server 308 may first look up its local database to find the corresponding proximity manager 306. This message may contain the following information:

Group identifier which devices belong to

Devices' identifiers

De-registration reason

In step 2 of FIG. 9A, the proximity manager 306 sends a response back to the IoT server 308.

In step 3 of FIG. 9A, the IoT server 308 sends an "IoT Service De-Registration Request" to "device 1" 304. The IoT server 308 may use this message to de-register proximity service only, or to de-register both proximity service and IoT service. This message may contain the following information:

The address of the proximity manager 306

Group identifier which the device belongs to

De-registration reason

In step 4 of FIG. 9A, "device 1" 304 sends a response back to the IoT server 308

In step -5 of FIG. 9A, the IoT server 308 sends an "IoT Service De-Registration Request" to "device 2" 302. The IoT server 308 may use this message to de-register proximity service only, or to de-register both proximity service and IoT service. This message may contain the following information:

The address of the proximity manager 306

Group identifier which the device belongs to

De-registration reason

In step 6 of FIG. 9A, "device 2" 302 sends a response back to the IoT server 308

In FIG. 9B, the IoT server 308 initiates de-registration but it goes through the proximity manager 306. For example, FIG. 9B shows the following exemplary steps:

In step 1 of FIG. 9B, the IoT server 308 decides to perform IoT service de-registration to some devices, which previously requested via the proximity manager 306 by sending an "IoT Service De-Registration Request" message to the corresponding proximity manager 306. The IoT server 308 may first look up its local database to find the corresponding proximity manager 306. This message may contain the following information:
  Group identifier which devices belong to
  Devices' identifiers
  De-registration reason In step 2 of FIG. 9B, the proximity manager 306 sends a response back to the IoT server 308

In step 3 of FIG. 9B, the proximity manager 306 sends a "Proximity Service De-Registration Request" to "device 1" 304 . The proximity manager 306 may use this message to de-register IoT service only, or to de-register both IoT service and proximity service. This message may contain the following information:
  The address of the IoT server 308
  Group identifier which the device belongs to
  De-registration reason In step 4 of FIG. 9B, "device 1" 304 sends a response back to the IoT server 308.

In step 5 of FIG. 9B, the proximity manager 306 sends a "Proximity Service De-Registration Request" to "device 2" 302. The proximity manager 306 may use this message to de-register IoT service only, or to de-register both IoT service and proximity service. This message may contain the following information:
  The address of the IoT server 308
  Group identifier which the device belongs to
  De-registration reason In step 6 of FIG. 9B, "device 2" 302 sends a response back to the IoT server 308.

It is understood that the entities performing the steps illustrated in FIGS. 9A-B are logical entities that may be implemented in the form of software (i.e., computer-executable instructions) stored in a memory of, and executing on a processor of, a device, server, or other computer system such as one of those illustrated in FIG. 16C or 16D. That is, the method(s) illustrated in FIGS. 9A-B may be implemented in the form of software (i.e., computer-executable instructions) stored in a memory of a computing device, such as for example the device or computer system illustrated in FIGS. 16C or 16D, which computer executable instructions, when executed by a processor of the computing device, perform the steps illustrated in FIGS. 9A-B.

Approach 5: Proximity-Manager-Initiated De-Registration

Figure 10A:
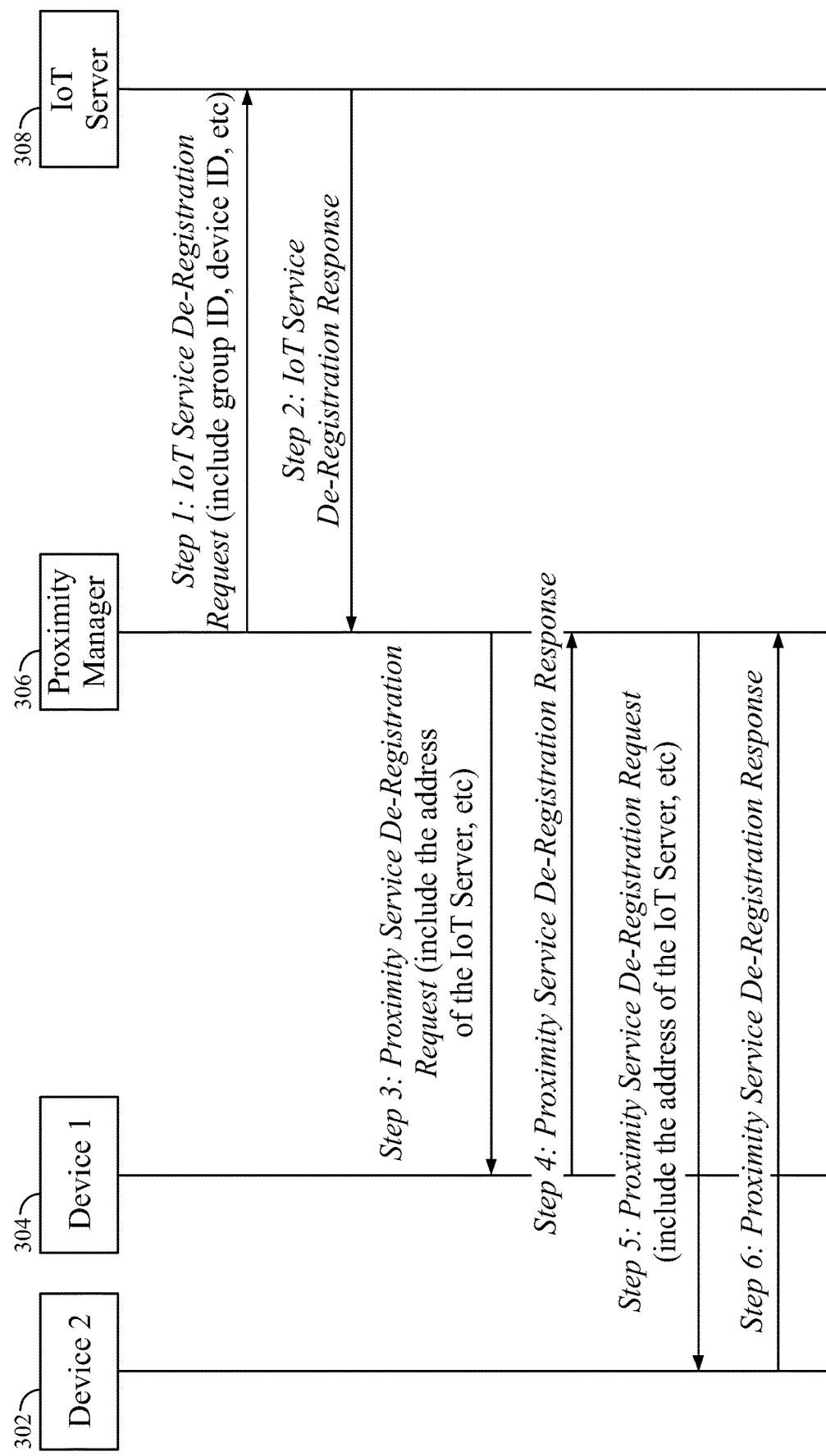
FIGS. 10A and 10B are diagrams that illustrate exemplary approaches for proximity-manager-initiated de-registration.
Figure 10B:
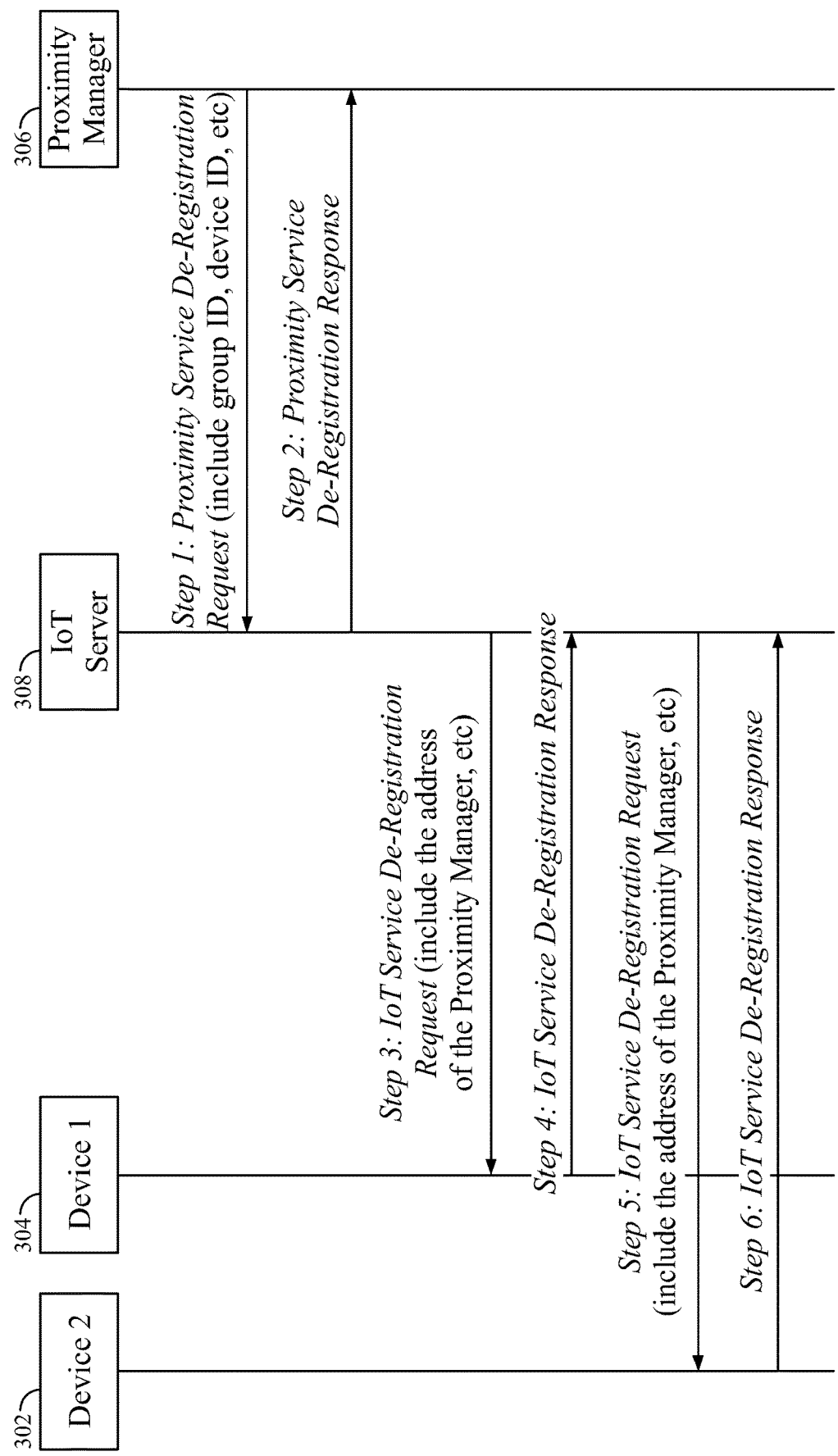

The proximity manager 306 can initiate IoT service de-registration based on certain policies. For example, if two devices are entering into a specific area where proximity services are disallowed, the proximity server can de-activate proximity services. In the second example, the proximity manager 306 finds the current proximity link between two devices becomes unreliable and of low quality, it can cancel proximity services. In the third example, the proximity manager 306 may find that the current IoT server 308 becomes unreliable or unsecure and cancel IoT services. FIGS. 10A-B illustrates the procedures for proximity-manager-initiated de-registration.

In FIG. 10A, the proximity manager 306 initiates and plays as a proxy to perform de-registration for multiple devices. For example, FIG. 10A shows the following exemplary steps:

In step 1 of FIG. 10A, the proximity manager 306 decides to perform IoT service de-registration for some devices by sending an "IoT Service De-Registration Request" message to the corresponding IoT server 308. The proximity manager 306 may first look up its local database to find the corresponding IoT server 308. This message may contain the following information:
  Group identifier which devices belong to
  The list of devices' identifiers
  De-registration reason In step 2 of FIG. 10A, the IoT server 308 sends a response back to the proximity manager 306

In step 3 of FIG. 10A, the proximity manager 306 sends a "Proximity Service De-Registration Request" to "device 1" 304. The proximity manager 306 may use this message to de-register IoT service only, or to de-register both IoT service and proximity service. This message may contain the following information:
  The address of the IoT server 308
  Group identifier which the device belongs to
  De-registration reason In step 4 of FIG. 10A, "device 1" 304 sends a response back to the proximity manager 306

In step 5 of FIG. 10A, the proximity manager 306 sends a "Proximity Service De-Registration Request" to "device 2" 302. The proximity manager 306 may use this message to de-register IoT service only, or to de-register both IoT service and proximity service. This message may contain the following information:
  The address of the IoT server 308
  Group identifier which the device belongs to
  De-registration reason In step 6 of FIG. 10A, "device 2" 302 sends a response back to the proximity manager 306

In FIG. 10B, the proximity manager 306 initiates de-registration but it goes through the IoT server 308. For example, shows the following exemplary steps:

In step 1 of FIG. 10B, the proximity manager 306 decides to perform proximity service de-registration to some devices by sending a "ProximityService De-Registration Request" message to the corresponding IoT server 308. The proximity manager 306 may first look up its local database to find the corresponding IoT server 308. This message may contain the following information:
  Group identifier which devices belong to
  Devices' identifiers
  De-registration reason In step 2 of FIG. 10B, the IoT server 308 sends a response back to the proximity manager 306

In step 3 of FIG. 10B, the IoT server 308 sends an "IoT Service De-Registration Request" to "device 1" 304. The IoT server 308 may use this message to de-register proximity service only, or to de-register both proximity service and IoT service. This message may contain the following information:
  The address of the proximity manager 306
  Group identifier which the device belongs to
  De-registration reason In step 4 of FIG. 10B, "device 1" 304 sends a response back to the IoT server 308.

In step 5 of FIG. 10B, the IoT server 308 sends an "IoT Service De-Registration Request" to "device 2" 302. The IoT server 308 may use this message to de-register proximity service only, or to de-register both proximity service and IoT service. This message may contain the following information:

The address of the proximity manager 306
Group identifier which the device belongs to
De-registration reason In step 6 of FIG. 10B, device 2 sends a response back to the IoT server 308.

EMBODIMENTS

There are several options to implement the proposed messages in section 5.2 and 5.3, i.e. to be implemented in different protocol layers.

It is understood that the entities performing the steps illustrated in FIGS. 10A-B are logical entities that may be implemented in the form of software (i.e., computer-executable instructions) stored in a memory of, and executing on a processor of, a device, server, or other computer system such as one of those illustrated in FIG. 16C or 16D. That is, the method(s) illustrated in FIGS. 10A-B may be implemented in the form of software (i.e., computer-executable instructions) stored in a memory of a computing device, such as for example the device or computer system illustrated in FIGS. 16C or 16D, which computer executable instructions, when executed by a processor of the computing device, perform the steps illustrated in FIGS. 10A-B.

Service Layer

The proposed messages can be implemented as service layer primitives and can be applied to ETSI M2M service architecture, one M2M architecture of common service functions, OMA device management, and/or OMA lightweight M2M.

Figure 11A:
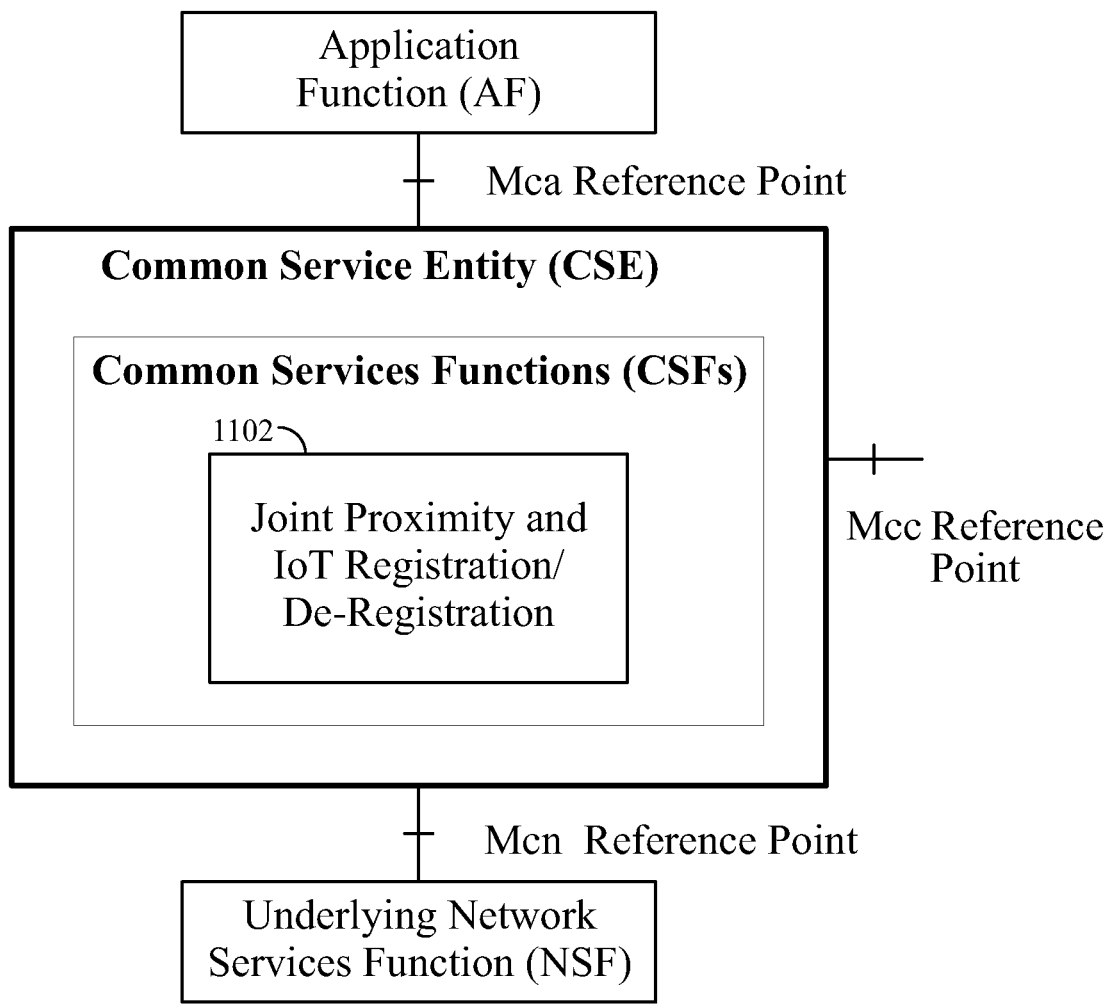
FIGS. 11A and 11B are diagrams that illustrate an exemplary approach for joint proximity and IoT registration/de-registration.
Figure 11B:
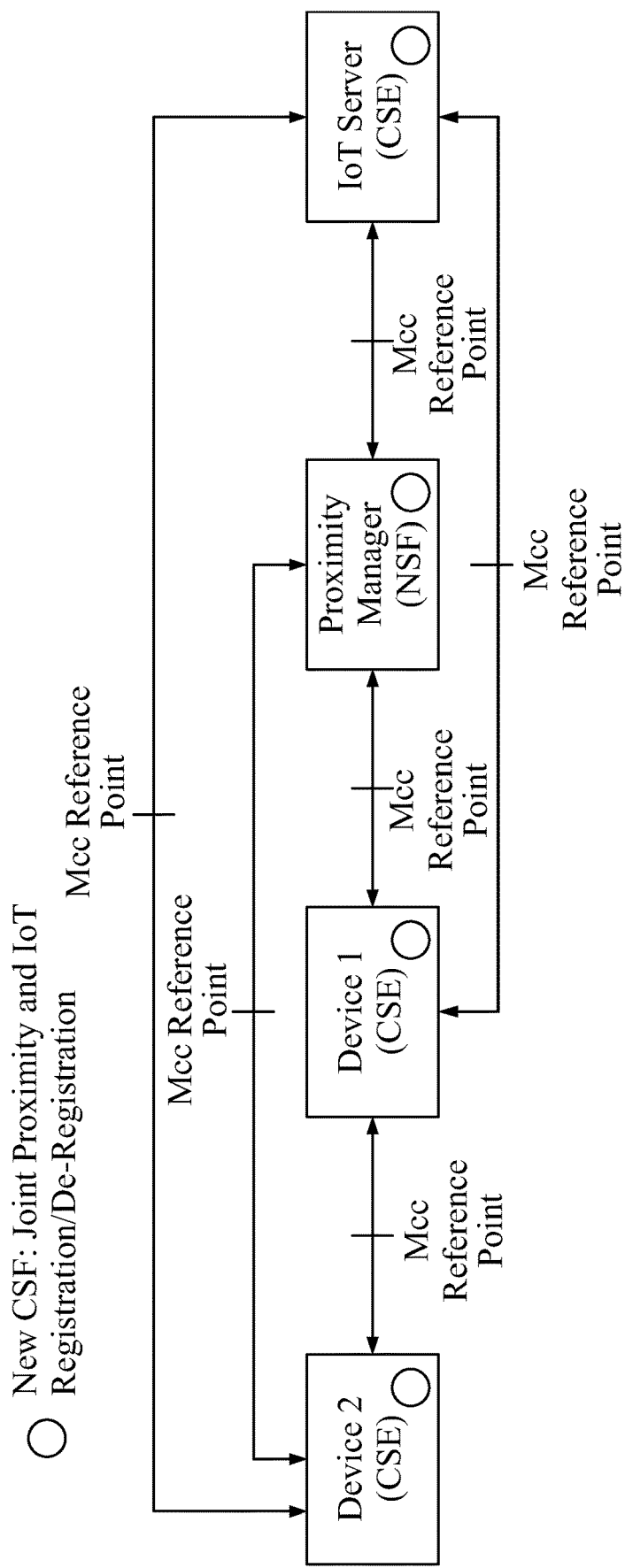

For example, as illustrated in FIG. 11A, the proposed "Joint Proximity and IoT Registration/De-Registration" approaches in section 5.2 and 5.3 are introduced as a new CSF in one M2M. This new CSF, "Joint Proximity and IoT Registration/De-Registration" 1102, can reside in M2M devices, M2M gateways, and M2M servers. As shown in FIG. 11B, an M2M gateway or an M2M server may act as a proximity manager, while an M2M server can play the role of an IoT server.

It is understood that the entities performing the steps illustrated in FIGS. 11A-B are logical entities that may be implemented in the form of software (i.e., computer-executable instructions) stored in a memory of, and executing on a processor of, a device, server, or other computer system such as one of those illustrated in FIG. 16C or 16D. That is, the method(s) illustrated in FIGS. 11A-B may be implemented in the form of software (i.e., computer-executable instructions) stored in a memory of a computing device, such as for example the device or computer system illustrated in FIGS. 16C or 16D, which computer executable instructions, when executed by a processor of the computing device, perform the steps illustrated in FIGS. 11A-B.

Figure 12:
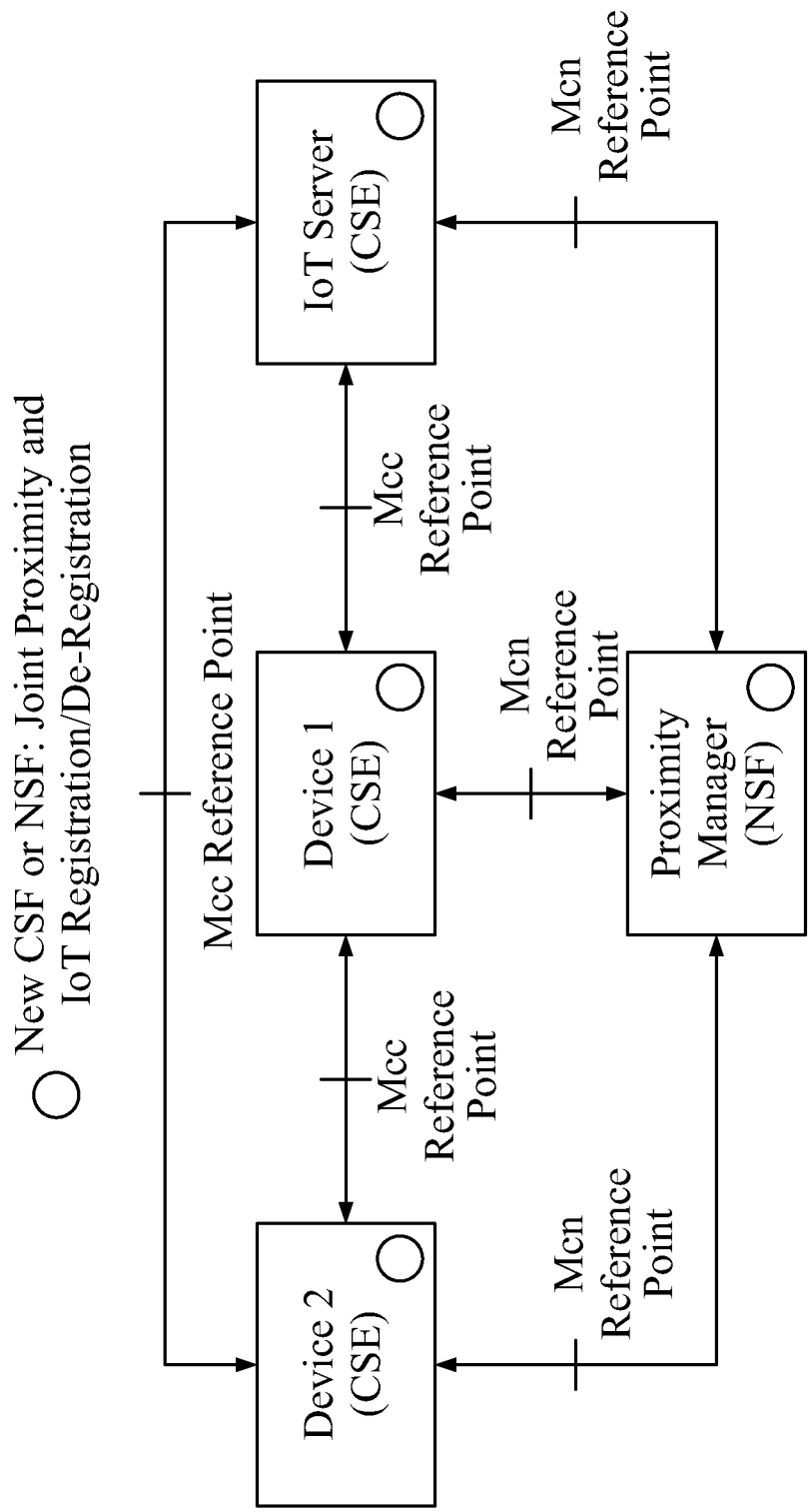
FIG. 12 is a diagram that illustrates an example where the proximity manager is implemented as a new Common Service Function (CSF).

In another example shown in FIG. 12, the proximity manager is implemented as a CSF. Then, device 1 and device 2 and the IoT server are implemented as CSE. The interface between the proximity manager and device 1/device 2/IoT server is Mcn reference point, while device 1, device 2, and IoT server interface with each other over Mcc reference point.

Medium Access Control (MAC) Layer

The proposed messages can be implemented as MAC layer commands when devices, IoT server, and proximity manager 306 are within the same local area network.

Figure 13:
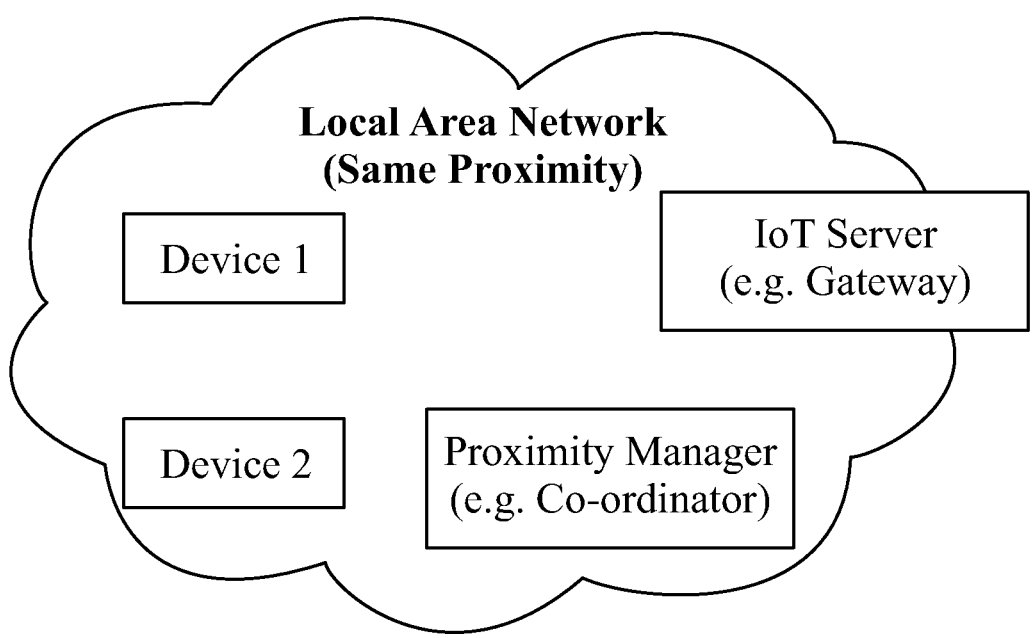
FIG. 13 is a diagram that illustrates a local area network.

For example, FIG. 13 illustrates a local area network consists of a gateway, and coordinator and 2 devices. The gateway is an IoT server to provide IoT services for the coordinator and 2 devices, while the coordinator manages proximity for device 1 and device 2 because it is more powerful with more resources such as computation, storage, communications (additional communication link), main-powered. For example, the coordinator could be a cluster or group head especially in two-tiered networks. The coordinator, two devices and the gateway together provide content sharing service, for instance. Device 1 and device 2 can leverage the proposed procedures to optimize proximity and IoT service management (i.e. registration and de-registration). The proposed messages can be implemented at the MAC layer since the gateway and the coordinator can communicate with each other within one hop.

Figure 14:
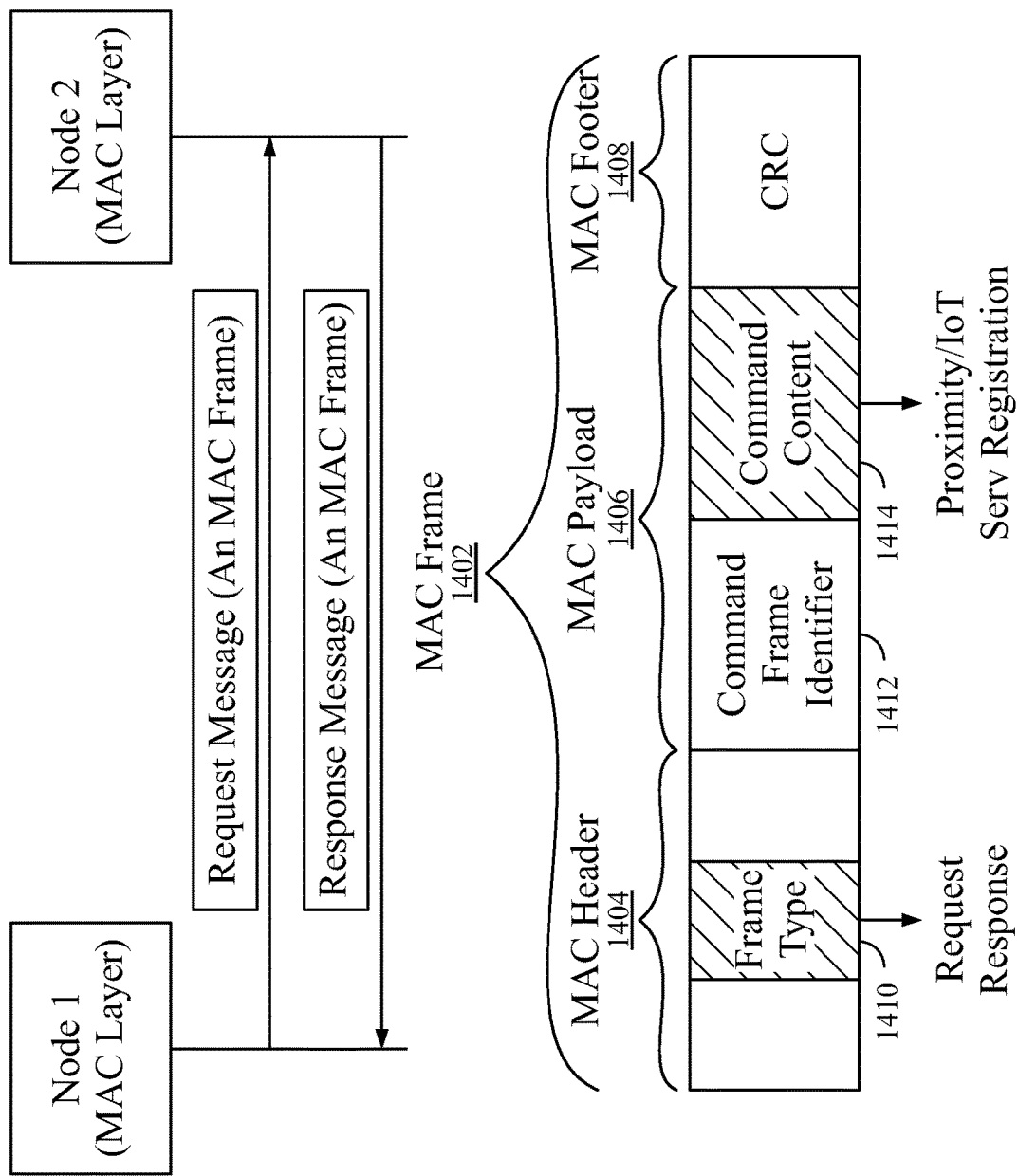
FIG. 14 is a diagram that illustrates another example of a local area network.

For example, the proposed new messages (either request message or response message) in previous sections can be implemented as new (MAC) commands (see FIG. 14). Each MAC command will be transmitted in an MAC frame 1402 consisting of an MAC frame header 1404, MAC payload 1406, and MAC Footer 1408. The MAC frame header 1404 indicates that the payload is a management command via existing "Frame Type" field 1410, while the existing field "Command Frame Identifier" 1412 in MAC payload 1406 indicates the specific command, and "Command Content" 1414 will contain all parameters/information related to this specific command. Basically, "Frame Type" 1410 is used to indicate that the MAC frame is the proposed Request or Response messages in this disclosure; "Command Content" 1414 contains the details of the proposed messages. Both "Frame Type" 1410 and "Command Content" 1414 together identify and stand each proposed message.

In FIG. 14, Node 1 and Node 2 could be "device 1" 304, "device 2" 302, proximity manager 306, or IoT server 308 as described in previous sections.

It is understood that the entities performing the steps illustrated in FIG. 14 are logical entities that may be implemented in the form of software (i.e., computer-executable instructions) stored in a memory of, and executing on a processor of, a device, server, or other computer system such as one of those illustrated in FIG. 16C or 16D. That is, the method(s) illustrated in FIG. 14 may be implemented in the form of software (i.e., computer-executable instructions) stored in a memory of a computing device, such as for example the device or computer system illustrated in FIGS. 16C or 16D, which computer executable instructions, when executed by a processor of the computing device, perform the steps illustrated in FIG. 14.

Figure 15:
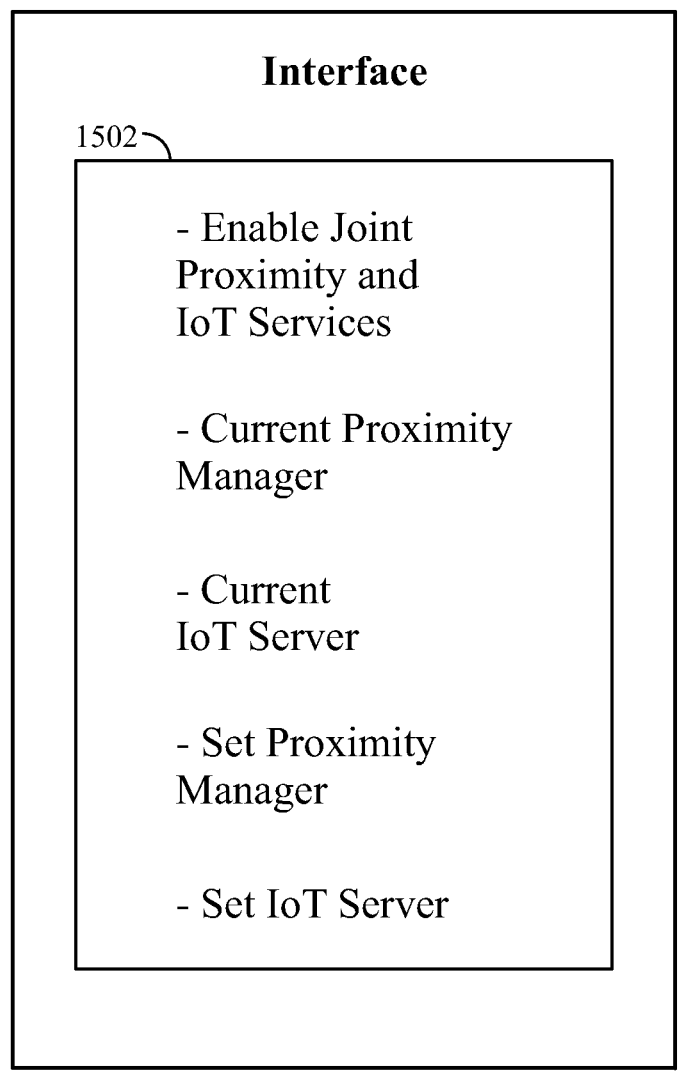
FIG. 15 is a diagram that illustrates an exemplary interface that can be used with the disclosed joint registration/deregistration of proximity services and IoT services systems and methods.

FIG. 15 is a diagram that illustrates an exemplary interface 1502 that can be used with the disclosed joint registration/deregistration of proximity services and IoT services systems and methods. Interface 1502 can be at the device that is to use the joint registration/deregistration of proximity services and IoT services or at a remote device. Interface 1502 can be used to enable/disable joint proximity and IoT services for a device or devices. Also, interface 1502 can be used to display proximity manager and IoT server data associated with a device or devices. Interface 1502 can also be used to set the proximity manager and IoT server associated with a device or devices, for example by providing an address of the proximity manager and/or IoT server.

The user interface 1502 shown in FIG. 15 may be displayed using a display such as display 42 of FIG. 16C or display 86 of FIG. 16D discussed below.

FIG. 16A is a diagram of an example machine-to machine (M2M), Internet of Things (IoT), or Web of Things (WoT)

communication system 10 in which one or more disclosed embodiments may be implemented. Generally, M2M technologies provide building blocks for the IoT/WoT, and any M2M device, gateway or service platform may be a component of the IoT/WoT as well as an IoT/WoT service layer, etc. Communication system 10 can be used to implement functionality of the disclosed embodiments and can include functionality and logical entities for joint registration/deregistration of proximity services and IoT services including proximity manager 306, IoT Server 308, devices 302 and 304, Joint Proximity and IoT registration/deregistration CSR 1102 as well as logical entities to produce interfaces such as interface 1502.

As shown in FIG. 16A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 16A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. The M2M gateway device 14 allows wireless M2M devices (e.g. cellular and non-cellular) as well as fixed network M2M devices (e.g. PLC) to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example.

Exemplary M2M devices 18 include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Referring to FIG. 16B, the illustrated M2M service layer 22 in the field domain provides services for the M2M application 20, M2M gateway devices 14, and M2M terminal devices 18 and the communication network 12. Communication network 12 can be used to implement functionality of the disclosed embodiments and can include functionality and logical entities for joint registration/deregistration of proximity services and IoT services including proximity manager 306, IoT Server 308, devices 302 and 304, Joint Proximity and IoT registration/deregistration CSR 1102 as well as logical entities to produce interfaces such as interface 1502.

The M2M service layer 22 may be implemented by one or more servers, computers, devices, virtual machines (e.g. cloud/ storage farms, etc.) or the like, including for example the devices illustrated in FIGS. 16C and 16D described below. It will be understood that the M2M service layer 22 may communicate with any number of M2M applications, M2M gateway devices 14, M2M terminal devices 18 and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways, for example as a web server, in the cellular core network, in the cloud, etc. Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines (e.g. cloud/compute/ storage farms, etc.) or the like.

Referring also to FIG. 16B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide. The connection methods of the present application may be implemented as part of a service layer 22 and 22'. The service layer 22 and 22' is a software middleware layer that supports value-added service capabilities through a set of Application Programming Interfaces (APIs) and underlying networking interfaces. Both ETSI M2M and oneM2M use a service layer that may contain the connection methods of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g. infrastructure node, middle node, application-specific node). Further, connection methods of the present application can implemented as part of an M2M network that uses a Service Oriented Architecture (SOA) and/or a resource-oriented architecture (ROA) to access services such as the connection methods of the present application.

In some embodiments, M2M applications 20 and 20' may include the applications that interact with capillary devices and therefore may be used in conjunction with the disclosed systems and methods.. The M2M applications 20 and 20' may include the applications that interact with the UE or gateway and may also be used in conjunction with other disclosed charging systems and methods. The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'.

Generally, the service layers 22 and 22' define a software middleware layer that supports value-added service capabilities through a set of Application Programming Interfaces (APIs) and underlying networking interfaces. Both the ETSI M2M and oneM2M architectures define a service layer. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities is provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or as some other component or module of a network, the service layer may be implemented as a logical entity (e.g., software, computer-executable instructions, and the like) executing either on one or more standalone servers, computers, or other computing devices or nodes in the network or as part of one or more existing servers, computers, or nodes of such network. As an example, a service layer or component thereof may be implemented in the form of software running on a server, computer, or device having the general architecture illustrated in FIG. 16C or FIG. 16D described below.

Further, the logical entities for joint registration/deregistration of proximity services and IoT services including proximity manager 306, IoT Server 308, devices 302 and 304, Joint Proximity and IoT registration/deregistration CSR 1102 as well as logical entities to produce interfaces such as interface 1502 can implemented as part of an M2M network that uses a Service Oriented Architecture (SOA) and/or a resource-oriented architecture (ROA) to access services of the present application.

FIG. 16C is a system diagram of an example device 30, that can be an M2M device, user equipment, gateway, UE/GW or any other nodes including nodes of the mobile care network, service layer network application provider, terminal device 18 or an M2M gateway device 14 for example. The device 30 can execute or include logical entities for joint registration/deregistration of proximity services and IoT services including proximity manager 306, IoT Server 308, devices 302 and 304, Joint Proximity and IoT registration/deregistration CSR 1102 as well as logical entities to produce interfaces such as interface 1502.

The device 30 can be part of an M2M network as shown in FIG. 16A-B or part of a non-M2M network. As shown in FIG. 16C, the device 30 may include a processor 32, a transceiver 34, a transmit/receive element 36, a speaker/microphone 38, a keypad 40, a display/touchpad/indicator(s) 42, non-removable memory 44, removable memory 46, a power source 48, a global positioning system (GPS) chipset 50, and other peripherals 52. It will be appreciated that the device 30 may include any sub-combination of the foregoing elements while remaining consistent with an embodiment. This device may be a device that uses and/or implements the disclosed systems and methods.

The processor 32 may be a general purpose processor, a special purpose processor, a conventional processor, a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGAs) circuits, any other type and number of integrated circuits (ICs), a state machine, and the like. The processor 32 may perform signal coding, data processing, power control, input/output processing, and/or any other functionality that enables the device 30 to operate in a wireless environment. The processor 32 may be coupled to the transceiver 34, which may be coupled to the transmit/receive element 36. While FIG. 16C depicts the processor 32 and the transceiver 34 as separate components, it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, and/or receive signals from, an M2M service platform 22. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. - - - C as a single element, the device 30 may include any number of transmit/receive elements 36. More specifically, the device 30 may employ MIMO technology. Thus, in an embodiment, the device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the device 30 may have multi-mode capabilities. Thus, the transceiver 34 may include multiple transceivers for enabling device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the device 30, such as on a server or a home computer.

The processor 30 may receive power from the power source 48, and may be configured to distribute and/or control the power to the other components in the device 30. The power source 48 may be any suitable device for powering the device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which may be configured to provide location information (e.g., longitude and latitude) regarding the current location of the device 30. It will be appreciated that the device 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

FIG. 16D is a block diagram of an exemplary computing system 90 on which, for example, the M2M service platform 22 of FIGS. 16A and 16B may be implemented. Computing system 90 may comprise a computer or server and may be controlled primarily by computer readable instructions, which may be in the form of software, wherever, or by whatever means such software is stored or accessed. Computing system 90 can execute or include logical entities for joint registration/deregistration of proximity services and IoT services including proximity manager 306, IoT Server 308, devices 302 and 304, Joint Proximity and IoT registration/deregistration CSR 1102 as well as logical entities to produce interfaces such as interface 1502.

Computing system 90 can be an M2M device, user equipment, gateway, UE/GW or any other nodes including nodes of the mobile care network, service layer network application provider, terminal device 18 or an M2M gateway device 14 for example. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91. CPU 91 and/or coprocessor 81 may receive, generate, and process the data used in various embodiments of the disclosed systems.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85. Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain network adaptor 97 that may be used to connect computing system 90 to an external communications network, such as network 12 of FIGS. 16A and 16B. In an embodiment, network adaptor 97 may receive and transmit data used by various disclosed systems and methods.

It is understood that any or all of the systems, methods, and processes described herein may be embodied in the form of computer executable instructions (i.e., program code) stored on a computer-readable storage medium. Such instructions, when executed by a machine, such as a computer, server, M2M terminal device, M2M gateway device, or the like, perform and/or implement the systems, methods and processes described herein. Specifically, any of the steps, operations or functions described above, including the operations of the gateway, UE, UE/GW, or any of the nodes of the mobile core network, service layer or network application provider, may be implemented in the form of such computer executable instructions. Logical entities for joint registration/deregistration of proximity services and IoT services including proximity manager 306, IoT Server 308, devices 302 and 304, Joint Proximity and IoT registration/deregistration CSR 1102 as well as logical entities to produce interfaces such as interface 1502 may be embodied in the form of the computer executable instructions stored on a computer-readable storage medium. Computer readable storage media include both volatile and nonvolatile, removable and non-removable media implemented in any method or technology for storage of information, but such computer readable storage media do not include signals. Computer readable storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other physical medium that can be used to store the desired information and that can be accessed by a computer.

In describing preferred embodiments of the subject matter of the present disclosure, as illustrated in the FIGs., specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. In a communication network comprising a first server that registers devices for a first service in the communication network and a plurality of second servers that register devices for a second service in the communication network, a method performed by the first server comprising:
    receiving a registration message from a device, wherein the registration message includes data comprising an indication of the device's capability on the second service, and location information of the device;
    registering the device for the first service at the first server;
    selecting a second server from the plurality of second servers based at least on the location information of the device;
    forwarding the data from the registration message to the selected second server to register the device for the second service at the selected second server; and
    sending, to the device, a response indicating an address of the selected second server,
    wherein the first server comprises one of a proximity manager for managing proximity services or an Internet of Things IoT) server for managing IoT services, and the selected second server comprises the other of the proximity manager for managing proximity services or the IoT server for managing IoT services.

2. The method of claim 1, wherein the first server is the IoT server and the selected second server is the proximity manager.

3. The method of claim 2, wherein the registration message contains an indication of the device's capability for proximity services.

4. The method of claim 2, wherein the registration message contains an indication of the device's requirements for proximity services.

5. The method of claim 1, wherein the first server is the proximity manager and the selected second server is the IoT server.

6. The method of claim 5, wherein the registration message contains an indication of the device's capability for IoT services.

7. The method of claim 5, wherein the registration message contains an indication of the device's requirements for IoT services.

8. In a communication network comprising a first server that registers devices for a first service in the communication network and a plurality of second servers that register devices for a second service in the communication network, a method performed by the first server comprising:
    receiving a de-registration message from a device, wherein the de-registration message comprising an address of a second server, de-registration reason and location information of the device;
    de-registering the device for the first service at the first server;
    determining a selected second server from the plurality of second servers based at least on the location information of the device;
    forwarding data including de-registration reason and the location information of the device from the de-registration message to the selected second server to de-register the device for the second service at the selected second server; and
    receiving, at the first server, a response indicating that the device has been de-registered from the second service at the selected second server,
    wherein the first server comprises one of a proximity manager for managing proximity services or an Internet of Things (IoT) server for managing MT services, and the selected second server comprises the other of the proximity manager for managing proximity services or the lloT server for managing IoT services.

9. The method of claim 8, wherein the first server is the IoT server and the selected second server is the proximity manager.

10. The method of claim 9, wherein the deregistration message contains an indication of an address of the proximity manager.

11. The method of claim 8, wherein the first server is the proximity manager and the selected second server is the IoT server.

12. The method of claim 11, wherein the deregistration message contains an indication of an address of the IoT server.

13. A first server comprising a processor, a memory, and communication circuitry, the first server being connected to a communication network via the communication circuitry, the first server further including computer-executable instructions stored in the memory of the first server which, when executed by the processor of the first server cause the first server to:

receive a registration message from a device, wherein the registration message includes data comprising an indication of the device's requirements for supporting a second service, an indication of the device's capability on a second service, register the device for a first service at the first server;

determine a second server from the plurality of second servers for device registration based on the location information;

forward the data from the registration message to the second server to register the device for the second service at the second server; and sending to the device, a response indicating an address of the second server, wherein the first server comprises one of a proximity manager for managing proximity services or an Internet of Things (Iot) server for managing IoT services, and the second server comprises the other of the proximity manager for managing proximity services or the IoT server for managing IoT services.

14. A first server comprising a processor, a memory, and communication circuitry, the first server being connected to a communication network via the communication circuitry, the first server further includin.g computer-executable instructions stored in the memory of the first server Which, when executed by the processor of the first server cause the first server to:

receive a de-registration message from a device, wherein the de-registration message comprising an address of a second server, de-registration reason and location information of the device:

deregister the device for a first service at the first server;

determine a second server from the plurality of second servers for device de-registration based on the location information:

forward data including de-registration reason and the location information of the device from the de-registration message to the second server to de-register the device for a second service at the second server: and sending, to the device, a response indicating that the device has been de-registered from the second service at the second server, wherein the first server comprises one of a proximity manager for managing proximity services or an Internet of Things (IoT) server for managing IoT services, and the second server comprises the other of the proximity manager for managing proximity services or the IoT server for managing IoT services.

* * * * *